US007463254B2

(12) United States Patent
Shino et al.

(10) Patent No.: US 7,463,254 B2

(45) Date of Patent: *Dec. 9, 2008

(54) DRIVING APPARATUS, DRIVER CIRCUIT, AND IMAGE DISPLAY APPARATUS

(75) Inventors: Kenji Shino, Kanagawa (JP); Tadashi Aoki, Kanagawa (JP); Aoji Isono, Kanagawa (JP); Kazuhiko Murayama, Kanagawa (JP); Yasuhiko Sano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

This patent is subject to a terminal disclaimer.

(21) Appl. No.: 11/449,703

(22) Filed: Jun. 9, 2006

(65) Prior Publication Data

US 2006/0227078 A1 Oct. 12, 2006

Related U.S. Application Data

(62) Division of application No. 10/460,231, filed on Jun. 13, 2003, now Pat. No. 7,079,123.

(30) Foreign Application Priority Data

Jun. 26, 2002 (JP) ............................. 2002-185741
Jan. 22, 2003 (JP) ............................. 2003-012944

(51) Int. Cl.
*G06F 3/038* (2006.01)

(52) U.S. Cl. .......................... 345/204; 345/90; 345/100

(58) Field of Classification Search ........... 345/87–100, 345/204–206, 208–214; 349/8, 33; 348/489
See application file for complete search history.

(56) References Cited

U.S. PATENT DOCUMENTS 4,904,895 A 2/1990 Tsukamoto et al. ......... 313/336

(Continued)

FOREIGN PATENT DOCUMENTS

JP 64-31332 2/1989

(Continued)

OTHER PUBLICATIONS

M.I. Elinson et al., "The Emission Of Hot Electrons And The Field Emission Of Electrons From Tin Oxide," Radio Engineering and Electronic Physics, pp. 1290-1296, No. 8, Aug. 1965.

(Continued)

*Primary Examiner*—Richard Hjerpe
*Assistant Examiner*—Mansour M Said
(74) *Attorney, Agent, or Firm*—Fitzpatrick, Cella, Harper & Scinto

(57) ABSTRACT

The present invention can provide a driving apparatus capable of compensating an influence of a voltage drop at low costs in a simple manner, which includes: a column driver circuit that generates at least one of modulation signals different in start reference time in one horizontal scanning period and the modulation signals obtained by using pulse width modulation and voltage amplitude modulation in combination; and a correction circuit that corrects a voltage of the row selection signal so as to suppress a voltage variation of the row selection signal, which is caused due to at least a resistance of an output stage of the row driver circuit and a current caused to flow into the resistance.

20 Claims, 33 Drawing Sheets

U.S. PATENT DOCUMENTS

| | | | | |
|---|---|---|---|---|
| 5,066,883 | A | 11/1991 | Yoshioka et al. | 313/309 |
| 5,434,599 | A | 7/1995 | Hirai et al. | 345/100 |
| 5,477,110 | A | 12/1995 | Smith et al. | 315/169.3 |
| 5,489,910 | A | 2/1996 | Kuwata et al. | 345/212 |
| 5,569,974 | A | 10/1996 | Morikawa et al. | 313/310 |
| 5,593,335 | A | 1/1997 | Suzuki et al. | 445/50 |
| 5,619,221 | A | 4/1997 | Hirai et al. | 345/58 |
| 5,646,643 | A | 7/1997 | Hirai et al. | 345/100 |
| 5,654,607 | A | 8/1997 | Yamaguchi et al. | 313/495 |
| 5,682,085 | A | 10/1997 | Suzuki et al. | 315/169.1 |
| 5,708,451 | A | 1/1998 | Baldi | 345/75.2 |
| 5,841,412 | A * | 11/1998 | Ebihara | 345/58 |
| 6,191,535 | B1 | 2/2001 | Saitou | 315/169.3 |
| 6,195,076 | B1 | 2/2001 | Sakuragi et al. | 345/74 |
| 6,404,135 | B1 | 6/2002 | Shino | 315/169.1 |
| 6,489,940 | B1 | 12/2002 | Aoki | 345/93 |
| 6,985,141 | B2 | 1/2006 | Abe et al. | 345/204 |
| 6,995,516 | B2 | 2/2006 | Aoki et al. | 315/169.4 |
| 7,079,123 | B2 * | 7/2006 | Shino et al. | 345/204 |
| 2002/0195966 | A1 | 12/2002 | Aoki et al. | 315/169.3 |
| 2003/0016189 | A1 | 1/2003 | Abe et al. | 345/55 |
| 2003/0025687 | A1 | 2/2003 | Shino et al. | 345/204 |
| 2003/0038792 | A1 | 2/2003 | Murayama et al. | 345/204 |
| 2003/0063108 | A1 | 4/2003 | Isono et al. | 345/690 |

FOREIGN PATENT DOCUMENTS

| | | |
|---|---|---|
| JP | 2-257551 | 10/1990 |
| JP | 3-55738 | 3/1991 |
| JP | 4-28137 | 1/1992 |
| JP | 5-188349 | 7/1993 |
| JP | 5-212905 | 8/1993 |
| JP | 6-12030 | 1/1994 |
| JP | 6-180564 | 6/1994 |
| JP | 6-230338 | 8/1994 |
| JP | 7-181917 | 7/1995 |
| JP | 07-181917 | 7/1995 |
| JP | 8-22261 | 1/1996 |
| JP | 9-281928 | 10/1997 |
| JP | 9-319327 | 12/1997 |
| JP | 10-39825 | 2/1998 |
| JP | 10-112391 | 4/1998 |
| JP | 10-153759 | 6/1998 |
| JP | 11-15430 | 1/1999 |
| JP | 11-326870 | 11/1999 |
| JP | 3049061 | 3/2000 |
| JP | 2000-221943 | 8/2000 |
| JP | 2000-310966 | 11/2000 |
| JP | 2001-92420 | 4/2001 |
| JP | 2001-092420 | 6/2001 |

OTHER PUBLICATIONS

G. Dittmer, *Electrical Conduction and Electron Emission of Discontinuous Thin Films*, Thin Solid Films, vol. 9, (1972) pp. 317-328.

M. Hartwell et al., *Strong Electron Emission From Patterned Tin-Indium Oxide Thin Films*, International Electron Devices Meeting (1975) pp. 519-521.

Araki et al., *Electronforming and Electron Emission of Carbon Thin Films*, Electron Beam Laboratory, Faculty of Engineering, Osaka University (1981) pp. 22-29 (English Abstract on p. 22).

W.P. Dyke, et al., *Field Emission*, Advances in Electronics and Electron Physics, vol. 8, Academic Press Inc. (1956) pp. 89-185.

C.A. Spindt et al., *Physical Properties of Thin-film Field Emission Cathodes with Molybdenum Cones*, J. Appl. Phys., vol. 47, No. 12 (1976) pp. 5248-5258.

C.A. Mead, *Operation of Tunnel-Emission Devices*, Journal of Applied Physics, vol. 32, No. 4, (1961) pp. 646-652.

* cited by examiner

DRIVING APPARATUS, DRIVER CIRCUIT, AND IMAGE DISPLAY APPARATUS

This application is a division of U.S. application Ser. No. 10/460,231, filed Jun. 13, 2003, now U.S. Pat. No. 7,079,123.

BACKGROUND OF THE INVENTION

1. Field of the Invention

The present invention relates to a driving apparatus for a matrix panel used in a monitor of a television receiver, a computer, etc., and an image display apparatus provided with the same. In particular, the invention relates to a driving apparatus for a matrix panel in which modulation elements such as semiconductor light emitting elements and electron emitting elements are arranged at intersections of a matrix, a driver circuit thereof, and an image display apparatus provided with the same.

2. Description of the Related Art

First, a description will be given of the electron emitting element as an example of the modulation element. FIG. 31 schematically shows a matrix panel used for a display apparatus etc.

In FIG. 31, an electron emitting element 1 is schematically shown as an example of the modulation element. A column wiring 2 and a row wiring 3 have wiring resistances 4 and 5 respectively according to a specific resistance of components or size of the wirings. Note that, for simplicity in illustration, a matrix having a size of 4×4 elements is adopted here. Needless to say, however, a matrix size is not limited to this. For example, in a case of using a multi-electron beam source for an image display apparatus, enough elements to achieve a desired image display may be arranged and wired.

In the multi-electron beam source in which the electron emitting elements are wired in passive matrix, electric signals are appropriately applied to the row and column wirings in order to output the desired electron beam.

FIG. 32 shows a column wiring drive waveform and a row wiring drive waveform of signals applied to the matrix panel. For example, in order to drive the electron emitting elements in any one of the rows in the matrix, a row selection signal having a selection voltage Vs is applied to the row wiring of the row to be selected, while a non-selection voltage Vns is applied to the row wiring in a non-selection state. In synchronization therewith, a drive voltage Ve is applied to the column wiring for a given time period in order to output the electron beam.

According to the above method, the voltage corresponding to Ve-Vs is applied to the electron emitting element in the row to be selected. On the other hand, the voltage corresponding to Ve-Vns is applied to the electron emitting element in the row in the non-selection state. If the voltages Ve, Vs, and Vns are set to an appropriate level based on an electron emission threshold of the electron emitting element, the electron emitting elements in the row to be selected may solely output the electron beam with the desired intensity. Also, a cold-cathode element exhibits high-speed response. Thus, by changing the length of period for which the drive voltage Ve is applied, that is, a pulse width of the voltage Ve as indicated by the arrow of FIG. 32, the length of period for which the electron beam is outputted can be changed.

Further, with a modulation system of controlling luminescence by changing a voltage amplitude to be applied to the column wiring and a current value therefore, the output of the electron beam can be controlled as well.

In the above example, the matrix having 4×4 elements has been described. However, for the image display apparatus that displays a television image in actuality, for example, in a case of VGA (video graphics array), the matrix having 640 (horizontal lines)×480 (vertical lines) elements is required. Considering a color image display, horizontal lines three times more than the 640 lines are required, i.e., the matrix having 1920 (horizontal lines)×480 (vertical lines) elements is required.

For example, assuming that the current flowing into the electron beam source becomes 1 mA, the current of 1 mA is required for driving the column wiring. On the other hand, the current required for driving the row wiring corresponds to 1 mA×1920=1.92 A since the current is caused to flow there into from all the column wirings. Therefore, a row wiring driver that drives the row wiring should have a current drive power of several A.

When considering the VGA by way of example, the row wiring driver has the outputs as many as 480 channels and thus, high costs are involved when the driver is constructed by discrete devices. Therefore, in many cases, it is incorporated into an IC. However, taking into consideration the driving of current with several amperes, it is required for an output buffer to have a low ON resistance.

Examples of a method of reducing the ON resistance of the output buffer in the IC include a method of increasing an IC chip area. In the case of increasing the chip area, for example, a high withstand voltage MOS should have a double diffusion structure and an occupied area of chip increases. When the output ON resistance (Ron) of 100 mΩ is supposedly needed, the chip occupies the area of about 1 $mm^2$.

Accordingly, assuming the IC having the output of 80 channels, the output buffer solely occupies the area of 80 $mm^2$. Further, in order to drive the output buffer, a pre-buffer is necessary. Actually, the chip area of substantially 100 $mm^2$ required only for the output buffer.

As described above, in order to decrease the resistance of the output buffer of the IC, the chip area should be increased. As a result, the number of chips that can be obtained from one wafer decreases, so that unit cost per chip increases. In particular, this largely affects the IC with the multiple outputs.

As a countermeasure against the above-mentioned problems, the inventors of the present invention have made intensive studies on a correction circuit that corrects variations of the voltage in order to suppress the voltage variation due to the ON resistance of the row driver circuit. However, the inventors have found that only the application of the correction circuit is insufficient to cope with the problems.

For example, if the column wiring is driven with simple pulse width modulation (PWM) along with the correction circuit, according to information on gradation to be displayed through pixels in the one row, the current flowing into the row wirings abruptly changes during one horizontal scanning period. Thus, the influence of response characteristics of the correction circuit may be exerted more consciously.

Also, due to the resistance at a connection portion where the modulation element is electrically connected with the driver circuit as well, an effective drive voltage actually applied to the modulation element may decrease beyond an allowable range.

SUMMARY OF THE INVENTION

The present invention has been made in view of the above problems and an object of the present invention is to suppress voltage variation due to an ON resistance of a row driver circuit.

Further, another object of the present invention is to suppress an influence of response characteristics of a correction circuit.

Also, another object of the present invention is to provide a low-cost driving apparatus with high reliability and an image display apparatus equipped with the same by using a row driver circuit capable of correcting an influence of voltage drop and a column driver circuit appropriate therefore in combination.

Also, another object of the present invention is to correct the voltage drop due to the resistance disposed outside the driver circuit without involving a complicated structure of the connection portion.

Also, another object of the present invention is to provide a driving apparatus for a matrix panel in which a modulation element is arranged in each of intersections of a matrix composed of a plurality of row wirings and a plurality of column wirings, including:

a row driver circuit adapted to supply a row selection signal to the row wiring selected among the plurality of row wirings;

a correction circuit that corrects a voltage of the row selection signal so as to suppress a voltage variation of the row selection signal, which is caused due to at least a resistance of an output stage of the row driver circuit and a current caused to flow into the resistance; and a column driver circuit adapted to supply to the plurality of column wirings a modulation signal having a pulse width and a voltage amplitude with at least the pulse width modulated according to gradation information, the column driver circuit generating the modulation signals different in start reference time in one horizontal scanning period and/or obtained by using pulse width modulation and voltage amplitude modulation in combination.

Also, another object of the present invention is to provide a driving apparatus for a matrix panel in which a modulation element is arranged in each of intersections of a matrix composed of a plurality of row wirings and a plurality of column wirings, including:

a row driver circuit adapted to supply a row selection signal to the row wiring selected among the plurality of row wirings;

a correction circuit that corrects a voltage of the row selection signal so as to suppress a voltage variation of the row selection signal, which is caused due to at least a resistance of an output stage of the row driver circuit and a current caused to flow into the resistance; and a column driver circuit adapted to supply to the plurality of column wirings a modulation signal having a pulse width and a voltage amplitude with at least the pulse width modulated according to gradation information, the column driver circuit distributing unit pulse components constituting the modulation signal so as to suppress a change of a current flowing into the selected row wiring in one horizontal scanning period.

Also, another object of the present invention is to provide a driving apparatus for a matrix panel in which a modulation element is arranged in each of intersections of a matrix composed of a plurality of row wirings and a plurality of column wirings, including:

a row driver circuit adapted to supply a row selection signal to the row wiring selected among the plurality of row wirings;

a correction circuit that corrects a voltage of the row selection signal through feedback of potential information of an output terminal in the row driver circuit; and a column driver circuit adapted to supply to the plurality of column wirings a modulation signal having a pulse width and a voltage amplitude with at least the pulse width modulated according to gradation information, the column driver circuit generating the modulation signals different in start reference time in one horizontal scanning period and/or obtained by using pulse width modulation and voltage amplitude modulation in combination.

Also, another object of the present invention is to provide a driving apparatus for a matrix panel in which a modulation element is arranged in each of intersections of a matrix composed of a plurality of row wirings and a plurality of column wirings, including:

a row driver circuit adapted to supply a row selection signal to the row wiring selected among the plurality of row wirings;

a correction circuit that corrects a voltage of the row selection signal through feedback of potential information of an output terminal in the row driver circuit; and a column driver circuit adapted to supply to the plurality of column wirings a modulation signal having a pulse width and a voltage amplitude with at least the pulse width modulated according to gradation information, the column driver circuit distributing unit pulse components constituting the modulation signal so as to suppress a change of a current flowing into the selected row wiring in one horizontal scanning period.

Also, another object of the present invention is to provide a driving apparatus for a matrix panel in which a modulation element is arranged in each of intersections of a matrix composed of a plurality of row wirings and a plurality of column wirings, including:

a row driver circuit adapted to supply a row selection signal to the row wiring selected among the plurality of row wirings;

a column driver circuit adapted to supply to the plurality of column wirings a modulation signal having a pulse width and a voltage amplitude with at least the pulse width modulated according to gradation information;

a correction circuit that corrects a voltage of the row selection signal so as to suppress a voltage variation of the row selection signal, which is caused due to at least a resistance of an output stage of the row driver circuit and a current caused to flow into the resistance; and a feed-forward circuit formed in the correction circuit and adapted to correct the row selection signal supplied to the selected row wiring in accordance with the gradation information.

Also, another object of the present invention is to provide a driving apparatus for a modulation element array in which a modulation element is arranged in each of intersections of a matrix composed of a row wiring and a plurality of column wirings, including:

a row driver circuit adapted to supply a row signal to the row wiring;

a column driver circuit adapted to supply to the plurality of column wirings a modulation signal modulated in accordance with gradation information;

a first correction circuit adapted to correct a voltage of the row signal through feedback of potential information of an output terminal in the row driver circuit; and a second correction circuit adapted to correct a voltage drop due to a resistance of a connection member between the output terminal and the element array and a current flowing into the resistance.

Also, another object of the present invention is to provide an image display apparatus including:

(i) a matrix panel including; a plurality of row wirings; a plurality of column wirings; and a plurality of modulation elements arranged in each of intersections of a matrix composed of the plurality of row wirings and the plurality of column wirings; and (ii) a driving apparatus for the matrix panel, including:

a row driver circuit adapted to supply a row selection signal to the row wiring selected among the plurality of row wirings;

a column driver circuit adapted to supply to the plurality of column wirings a modulation signal having a pulse width and a voltage amplitude with at least the pulse width modulated according to gradation information, the column driver circuit generating the modulation signals different in start reference time in one horizontal scanning period and/or obtained by using pulse width modulation and voltage amplitude modulation in combination; and a correction circuit that corrects a voltage of the row selection signal so as to suppress a voltage variation of the row selection signal due to a voltage drop caused by at least a resistance of an output stage of the row driver circuit and a current flowing into the selected row wiring according to gradation information.

Also, another object of the present invention is to provide an image display apparatus including:

(i) a matrix panel including a plurality of row wirings; a plurality of column wirings: and a plurality of modulation elements arranged in each of intersections of a matrix composed of the plurality of row wirings and the plurality of column wirings; and (ii) a driving apparatus for the matrix panel, including a row driver circuit adapted to supply a row selection signal to the row wiring selected among the plurality of row wirings;

a column driver circuit adapted to supply to the plurality of column wirings a modulation signal having a pulse width and a voltage amplitude with at least the pulse width modulated according to gradation information, the column driver circuit distributing unit pulse components constituting the modulation signal so as to suppress a variation of a current flowing into the selected row wiring in one horizontal scanning period; and a correction circuit that corrects a voltage of the row selection signal so as to suppress a voltage variation of the row selection signal due to a voltage drop caused by at least a resistance of an output stage of the row driver circuit and a current flowing into the selected row wiring according to gradation information.

Also, another object of the present invention is to provide an image display apparatus including:

(i) a matrix panel including: a plurality of row wirings; a plurality of column wirings; and a plurality of modulation elements arranged in each of intersections of a matrix composed of the plurality of row wirings and the plurality of column wirings; and (ii) a driving apparatus for the matrix panel, including:

a row driver circuit adapted to supply a row selection signal to the row wiring selected among the plurality of row wirings;

a column driver circuit adapted to supply to the plurality of column wirings a modulation signal having a pulse width and a voltage amplitude with at least the pulse width modulated according to gradation information, the column driver circuit generating the modulation signals different in start reference time in one horizontal scanning period and/or obtained by using pulse width modulation and voltage amplitude modulation in combination; and a correction circuit that corrects a voltage of the row selection signal through feedback of potential information of an output terminal in the row driver circuit.

Also, another object of the present invention is to provide an image display apparatus including:

(i) a matrix panel including: a plurality of row wirings; a plurality of column wirings; and a plurality of modulation elements arranged in each of intersections of a matrix composed of the plurality of row wirings and the plurality of column wirings; and (ii) a driving apparatus for the matrix panel, including:

a row driver circuit adapted to supply a row selection signal to the row wiring selected among the plurality of row wirings;

a column driver circuit adapted to supply to the plurality of column wirings a modulation signal having a pulse width and a voltage amplitude with at least the pulse width modulated according to gradation information, the column driver circuit distributing unit pulse components constituting the modulation signal so as to suppress a change of a current flowing into the selected row wiring in the one horizontal scanning period; and a correction circuit that corrects a voltage of the row selection signal through feedback of potential information of an output terminal in the row driver circuit.

Also, another object of the present invention is to provide an image display apparatus including:

(i) a matrix panel including: a plurality of row wirings; a plurality of column wirings; and a plurality of modulation elements arranged in each of intersections of a matrix composed of the plurality of row wirings and the plurality of column wirings; and (ii) a driving apparatus for the matrix panel, including:

a row driver circuit adapted to supply a row selection signal to the row wiring selected among the plurality of row wirings;

a column driver circuit adapted to supply to the plurality of column wirings a modulation signal having a pulse width and a voltage amplitude with at least the pulse width modulated according to gradation information;

a correction circuit that corrects an output voltage of the row selection signal so as to suppress a voltage variation of the row selection signal due to a voltage drop caused by at least a resistance of an output stage in the row driver circuit and a current flowing into the selected row wiring according to gradation information; and a feed-forward circuit formed in the correction circuit and adapted to correct the row selection signal supplied to the selected row wiring in accordance with the gradation information.

Also, another object of the present invention is to provide an image display apparatus including:

(i) a matrix panel including: a row wiring; a plurality of column wirings: and a plurality of modulation elements arranged in each of intersections of a matrix composed of the row wiring and the plurality of column wirings; and (ii) a driving apparatus for the matrix panel, including:

a row driver circuit adapted to supply a row signal to the row wiring;

a column driver circuit adapted to supply to the plurality of column wirings a modulation signal having a pulse width and a voltage amplitude with at least the pulse width modulated according to gradation information;

a first correction circuit adapted to correct a voltage of the row signal through feedback of potential information of an output terminal in the row driver circuit; and a second correction circuit adapted to correct a voltage drop due to a resistance of a connection member between the output terminal and the matrix panel and a current flowing into the resistance.

Also, another object of the present invention is to provide a driver circuit having a driving output terminal connected with an emission element through a connection member, including:

a driving transistor in which a pair of main electrodes are connected to the driving output terminal side and a reference voltage source side;

an operational amplifier as a control circuit adapted to control an output voltage from the driving transistor;

a detecting transistor adapted to detect a current flowing into the driving transistor; and a correction circuit adapted to correct the output voltage from the driving output terminal, wherein the correction circuit includes a feedback loop adapted to detect a current flowing into the detecting transistor for feedback to the operational amplifier as the control circuit.

Also, another object of the present invention is to provide a driver circuit having a driving output terminal connected with an emission element through a connection member, including:

a driving transistor in which a pair of main electrodes are connected to the driving output terminal side and a reference voltage source side;

a control circuit adapted to control an output voltage from the driving transistor;

a detecting transistor adapted to detect a current flowing into the driving transistor; and a correction circuit adapted to correct the output voltage from the driving output terminal, wherein the correction circuit includes a first feedback loop adapted to detect the output voltage of the driving output terminal for feedback to the control circuit and a second feedback loop adapted to detect a current flowing into the detecting transistor for feedback to the control circuit.

Also, another object of the present invention is to provide an image display apparatus including:

(i) a matrix panel including: a plurality of row wirings; a plurality of column wirings; and a plurality of modulation elements arranged in each of intersections of a matrix composed of the plurality of row wirings and the plurality of column wirings;

(ii) a driving device adapted to drive the matrix panel, which includes:

a driving transistor in which a pair of main electrodes are connected to the driving output terminal side adapted to supply a signal and a reference voltage source side;

a control circuit adapted to control an output voltage from the driving transistor;

a detecting transistor adapted to detect a current flowing into the driving transistor;

a feedback loop adapted to detect a current flowing into the detecting transistor for feedback to the control circuit; and a correction circuit adapted to correct the output voltage from the driving output terminal; and (iii) a connection member that electrically connects the matrix panel and the driving device to thereby supply a signal adapted to drive the modulation element.

DETAILED DESCRIPTION OF THE PREFERRED EMBODIMENTS

Figure 1:
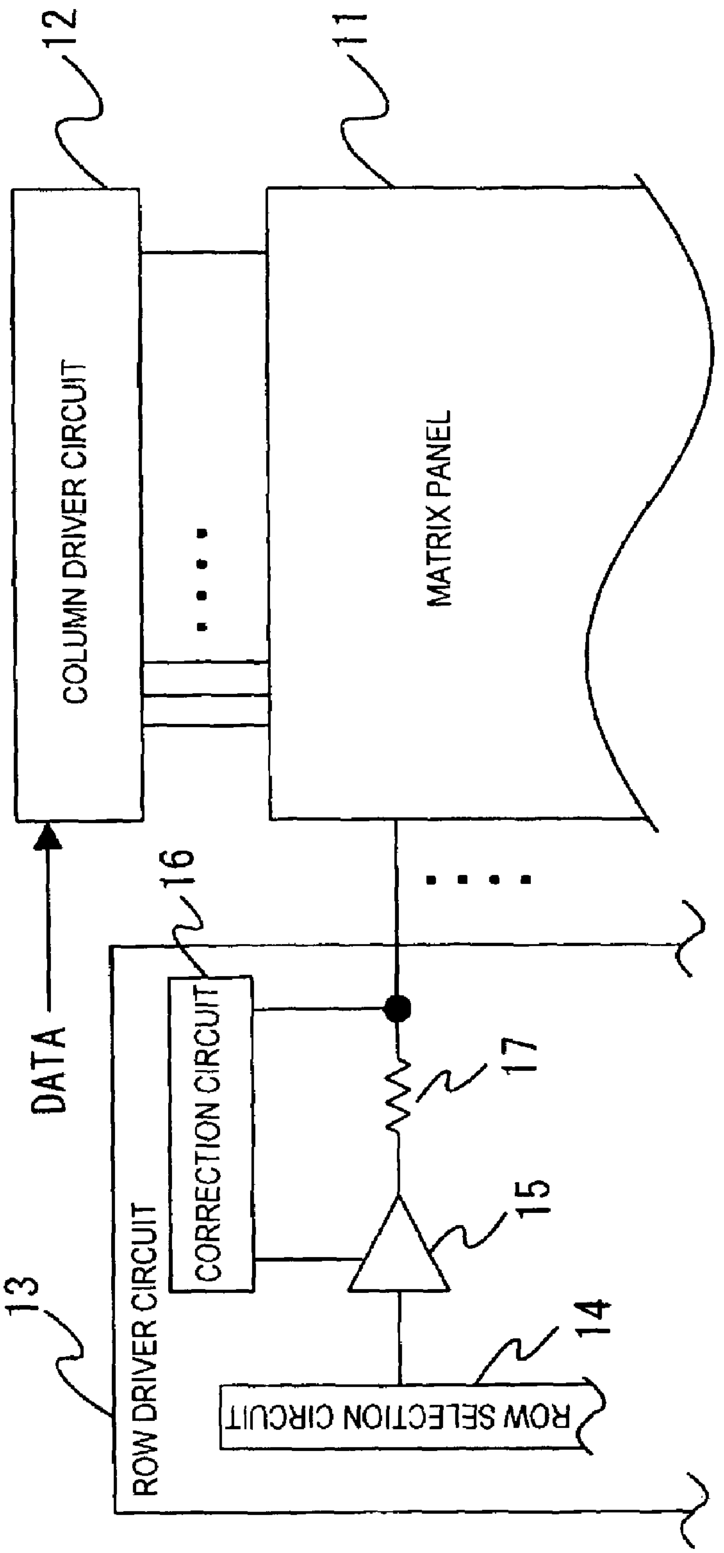
FIG. 1 is a block diagram illustrating a basic structure of a driving apparatus for a matrix panel according to the present invention.

Hereinafter, referring to the drawings, preferred embodiments of the present invention will be described in detail by way of example. Note that sizes, materials, shapes, and relative arrangements of components described in the embodiments should not be construed restrictively to limit the present invention thereto unless otherwise specified.

FIG. 1 shows a driving apparatus for a matrix panel according to a first aspect of the present invention.

The driving apparatus includes as main components: a column driver circuit 12 adapted to supply modulation signals to a column wiring; a row driver circuit 13 adapted to supply row selection signals to a selected row wiring; a row selection circuit 14 such as a shift register; an output buffer 15 as an output stage of the row driver circuit; and a correction circuit 16 adapted to correct voltage drop due to at least an ON resistance of the output buffer 15, the driving apparatus driving a matrix panel 11.

In the case where the output buffer 15 constitutes, for example, a CMOS inverter, the ON resistance corresponds to a resistance of an nMOS or pMOS transistor itself in an ON state. In this case, for simplicity, an ON resistance 17 of the output buffer is indicated as shown in FIG. 1.

The correction circuit 16 serves to suppress voltage variation of the row selection signal due to the voltage drop caused by at least the ON resistance of the output buffer 15 of the row driver circuit 13 and the current flowing into the selected row wiring according to gradation information (i.e., current flowing into the output buffer 15). Thus, the voltage of the row selection signal is corrected. For example, if the voltage (potential information) of an output terminal of the output buffer 15 is detected and the potential information is fed back, the output buffer 15 can be controlled so as to suppress the output voltage variation of the output buffer 15.

Figure 2B:
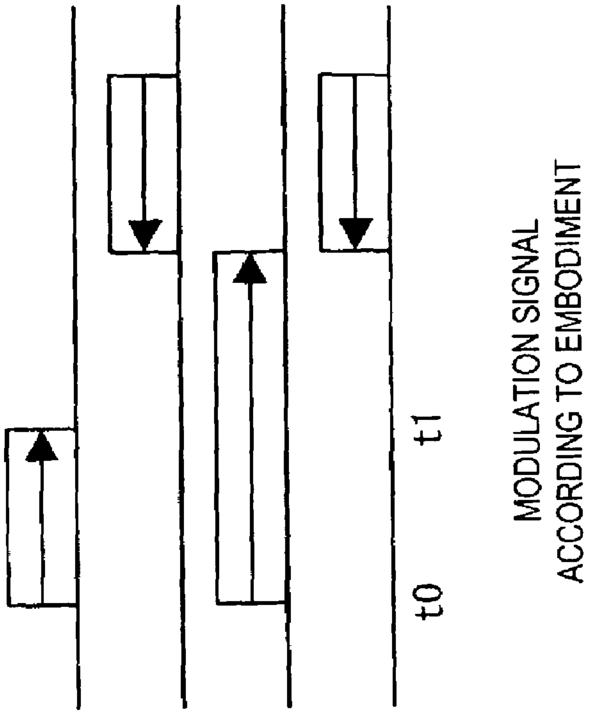
FIGS. 2A and 2B show a modulation signal waveform according to Comparative Example and a modulation signal waveform used in the present invention, respectively.
Figure 2A:
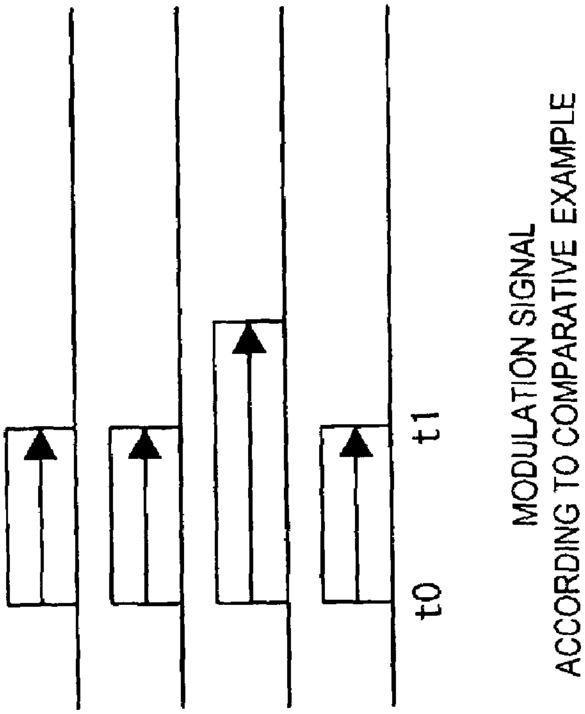
Figure 3:
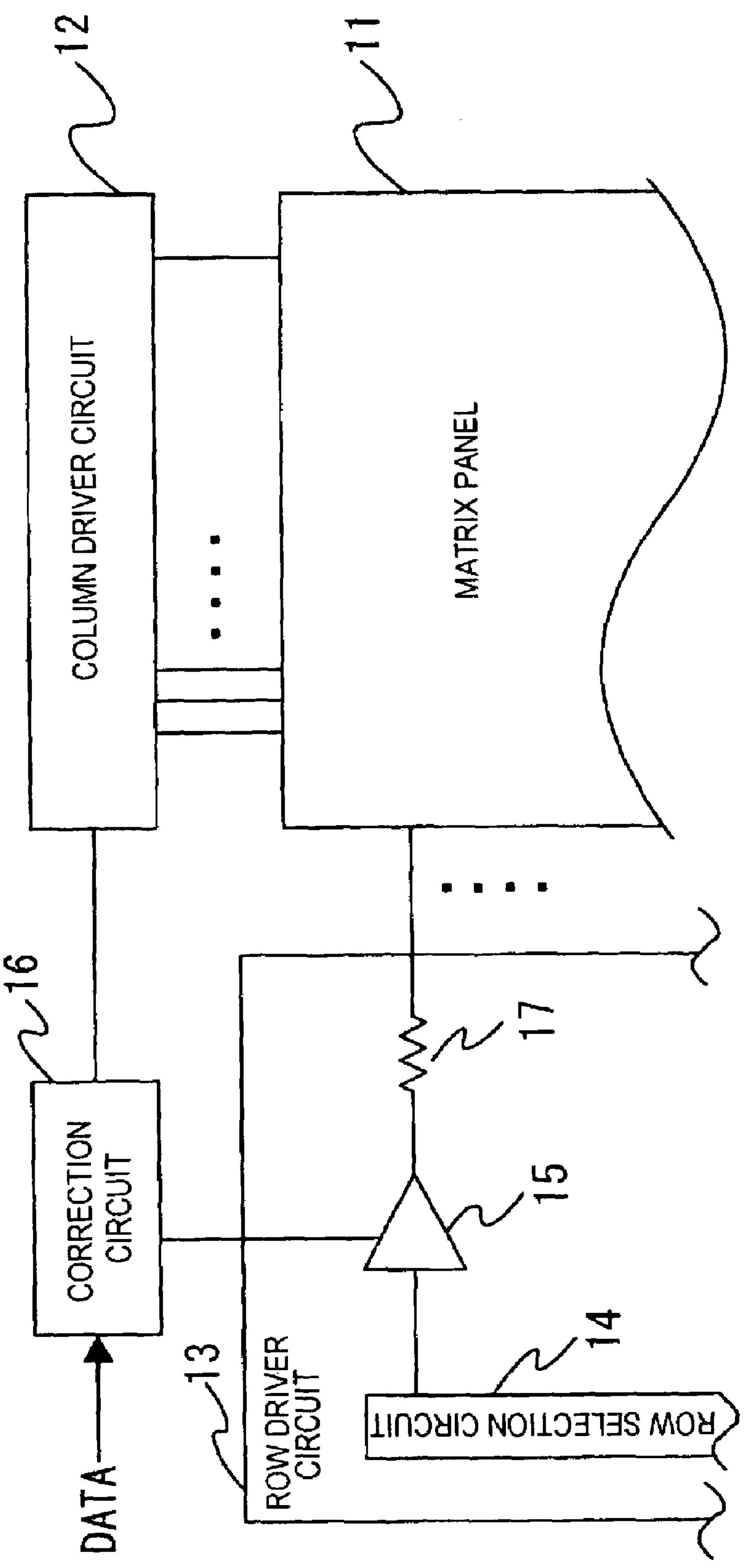
FIG. 3 is a block diagram illustrating a basic structure of another driving apparatus for a matrix panel according to the present invention.

Here, regarding the modulation signals supplied to the column wiring from the column driver circuit 12, in the modulation signals supplied to all of the four column wirings as shown in FIG. 2A, a reference time for pulse width modulation is set to t0. Thus, for example, at the time t1, the current flowing into the row wiring abruptly varies. This occurs due to correspondence in pulse falling edge among the three modulation signals at the same gradation level at the time t1. When the current flowing into the row wiring abruptly varies, the current flowing into the output buffer 15 connected thereto also varies in an abrupt manner. Accordingly, despite the application of the correction circuit 16, the response characteristics of the output buffer 15 cannot follow abrupt change of the current, which may lead to an erroneous operation of the matrix panel.

Therefore, according to an embodiment of the present invention, as shown in FIG. 2B, in some modulation signals, the reference time for the pulse width modulation is changed, so that the probability that the pulse voltages simultaneously fall is reduced. As a result, it is possible to suppress the abrupt change in the current flowing into the row wiring and the output buffer connected thereto and to prevent the erroneous operation.

In this way, according to the present invention, the modulation signal that is modulated according to the gradation information so as to suppress the abrupt change of the current flowing into the row wiring selected during one horizontal scanning period is used.

The correction circuit 16 used for the present invention is not limited to a negative feedback circuit as described above but may be a feed-forward circuit that controls the output voltage at the output stage according to display information (gradation information) DATA to be displayed through the pixels (display elements) in one row.

In the case where as the correction circuit of the present invention, the feedback type correction circuit is used, a detection point of the potential information is set, for example, to an output terminal of a semiconductor integrated circuit chip, an output terminal of a package on which the semiconductor integrated circuit chip is mounted, a terminal of a flexible wiring, or an input terminal of the matrix panel. When the detection point is provided far from the output terminal of the output buffer and the wiring resistance component existing therebetween is unallowable, a voltage set value of the row selection signal to be supplied is determined while considering the wiring resistance component. Therefore, the correction can be performed with higher precision.

As another preferable embodiment, a comparison unit that compares the potential information at the detection point and the reference value is used in common and a switch adapted to selectively connect the detection point and the comparison unit is provided. Also, the following is preferably adopted.

In order to increase a light emission amount and an electron emission amount during one horizontal scanning period, the row selection signals are simultaneously supplied two at least the two rows. In this case, the quantity of the current flowing through one of selected rows is same as the other one of selected rows. That is, a potential information at the detection point of one selected row is commonly used for correction of the simultaneous-selected row.

The correction circuits are provided in a number corresponding to the number of rows simultaneously selected, for requiring accuracy. The respective correction circuits are adapted to simultaneously correct the corresponding row selection signals.

Also, the correction circuit is not needed to operate all the time but may operate for correction only during a given period in the one horizontal scanning period, thereby further suppressing the erroneous operation.

The correction circuit can easily make correction by controlling either a source voltage or an emitter voltage of the transistor constituting the output stage of the row driver circuit or controlling either a gate voltage or a base voltage of the transistor. In the former case, the driving transistors are provided in series to a main electrode of a switching transistor that performs the row selection. Thus, the potential of a control electrode may be controlled. In the latter case, it is conceivable that a single transistor serves as both of the switching transistor and the driving transistor.

Also, as described below, it is also preferable that the correction circuit be provided so as to correct the voltage drop in the connection portion closer to the matrix panel side than the detection point.

The modulation signals used for the present invention are not limited to the modulation signals having the different start reference times during one horizontal scanning period as in the embodiment of FIG. 2B. Alternatively, the modulation signals for which the pulse width modulation and the voltage amplitude modulation are combined may be adopted as described below. In other words, it is preferable that the column driver circuit distribute unit pulse components constituting the modulation signals so as to suppress the change of the current flowing into the selected row wiring during one horizontal scanning period.

For example, besides the operation of setting the start reference times different, the following modulation system is preferably adopted. That is, the pulse width modulation is performed with the given amplitude within the range of the low gradation level, whereas the pulse width modulation is performed with the larger amplitude within the range of the high gradation level. Namely, within the range of the low gradation level, the voltage amplitude is fixed for the pulse width modulation during a given period in one horizontal scanning period. Within the subsequent middle gradation level range, the voltage amplitude is increased by one step for the pulse width modulation. Further, within the high gradation level range subsequent to the middle gradation level, the voltage amplitude is increased by one more step for the pulse width modulation. Such a modulation system is preferably adopted as well. Further, the aforementioned method of setting the start reference times different is preferably used in combination with this method.

Further, in order to suppress the erroneous operation at the rising and/or falling time of the voltage pulse of the modulation signal, the voltage pulse is preferably made to rise or fall stepwise.

To be specific the modulation signal is subjected to pulse width control with a unit slot width Δt, in which an amplitude at each of slots undergoes amplitude control in n steps of $A_1$ to $A_n$ (where n is an integer equal to or more than 2 and $0<A_1<A_2< \dots <A_n$). Further, the drive waveforms having a rising portion up to a predetermined amplitude $A_k$ (where k is an integer equal to or more than 2 and equal to or less than n) all rise up to the predetermined amplitude $A_k$ from a reference level through peak values of the amplitude $A_1$ to an amplitude $A_{k-1}$ in order by at least one slot at a time.

Alternatively, the modulation signal is subjected to pulse width control with a unit slot width Δt, in which an amplitude at each of slots undergoes amplitude control in n steps of $A_1$ to $A_n$ (where n is an integer equal to or more than 2 and $0<A_1<A_2< \dots <A_n$). Further, the drive waveforms having a falling portion from a predetermined amplitude $A_k$ (where k is an integer equal to or more than 2 and equal to or less than n) all fall from the predetermined amplitude $A_k$ to a reference level through the amplitudes of an amplitude $A_{k-1}$ to the amplitude $A_1$ in order by at least one slot at a time.

Preferable examples of the matrix panel to be used in the present invention include: a display panel in which the semiconductor light emitting element such as an organic EL element or an inorganic EL element is used as the modulation element; a self-luminous display panel represented by a fluorescent indicator panel for which the electron emitting element as the modulation element and a phosphor are used; and an electron emitting panel composed of an electron emitting element array without using the phosphor. In particular, the present invention provides significant effects in the case of the modulation element such as the semiconductor light emitting element or the surface-conduction electron emitting element, in which the current flowing into the row wirings tends to increase with an increase in screen size and definition.

As the electron emitting element to be used in the present invention, there are known two types: a thermionic cathode element and a cold cathode element of those, examples of known cold cathode elements include: the surface-conduction emission element; a field emission element (hereinafter, referred to as FE element); and a metal/insulating layer/metal (MIM) emission element (hereinafter, referred to as MIM emission element). The adopted surface-conduction emission element is disclosed, for example, by M. I. Elinson in "Radio Eng. Electron Phys., 10, 1290 (1965)" and the like. The element utilizes the phenomenon that the electron emission takes place by causing the current to flow in parallel to the surface of the thin film with a small area formed on the substrate.

Figure 4:
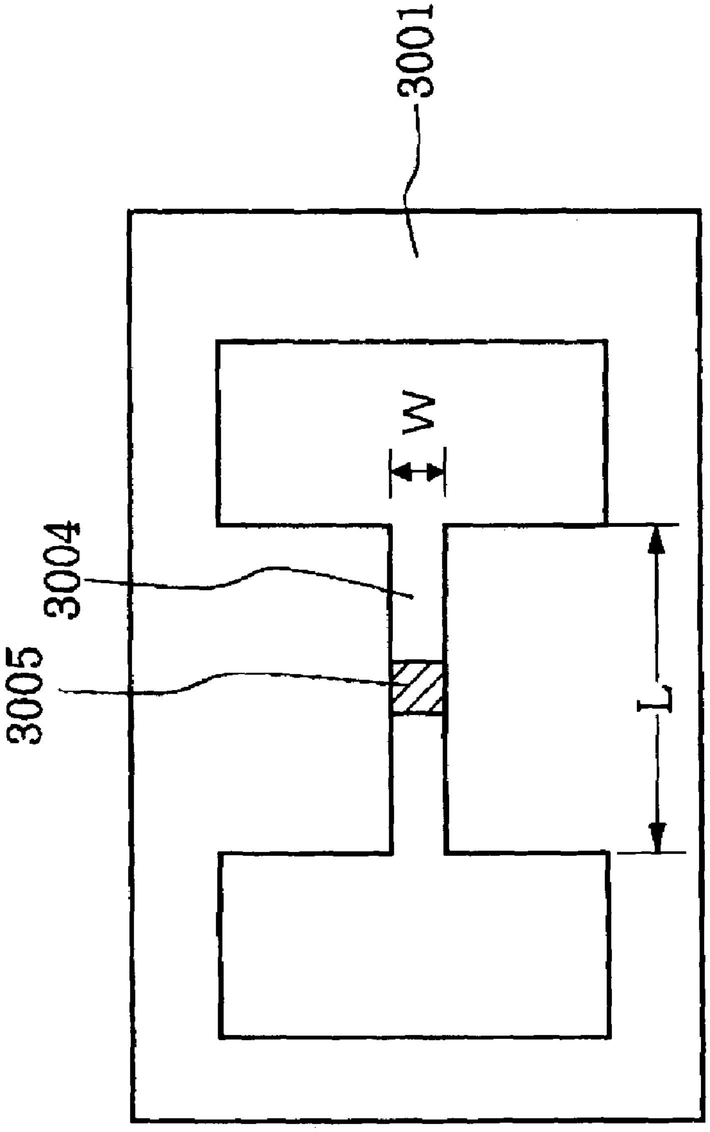
FIG. 4 is a plan view showing an example of a surface-conduction emission element structure used in the present invention.

A typical example of element structures of those surface-conduction emission elements is shown in FIG. 4. In FIG. 4, the surface-conduction emission element corresponds to a conductive thin film 3004 formed of metal oxide on a substrate 3001 through sputtering. The conductive thin film 3004 has an H-shaped planar form as shown in the figure. An energization process called energization forming as described below is conducted on the conductive thin film 3004, thereby forming an electron emitting portion 3005. In the figure, an interval (length) L is set to 0.5 to 1 (mm) and an interval (width) W is set to 0.1 (mm). Note that, for simplicity in illustration, the electron emitting portion 3005 is arranged in the center of the conductive thin film 3004 in a rectangular shape, but this arrangement is adopted for the schematic illustration rather than the accurate illustration of the actual position or shape of the electron emitting portion.

In the element disclosed by M. Hartwell et al. and such like surface-conduction emission elements, the conductive thin film 3004 is generally subjected to the energization process called energization forming prior to the electron emission, thereby forming the electron emitting portion 3005.

In other words, the energization forming is a process as follows. That is, the conductive thin film 3004 is applied with a constant D.C. voltage at both ends thereof or applied with the D.C. voltage while being boosted at a considerably slow rate of about 1 V/min, for example, for energization. In this way, the conductive thin film 3004 is locally destructed, or deformed or transformed, thereby forming the electron emitting portion 3005 in an electrically high-resistant state. Note that, fissures develop in a part of the conductive thin film 3004 locally destructed, deformed or transformed. When the appropriate voltage is applied to the conductive thin film 3004 after the energization forming, the electron emission is observed in the vicinity of the fissures.

Figure 5:
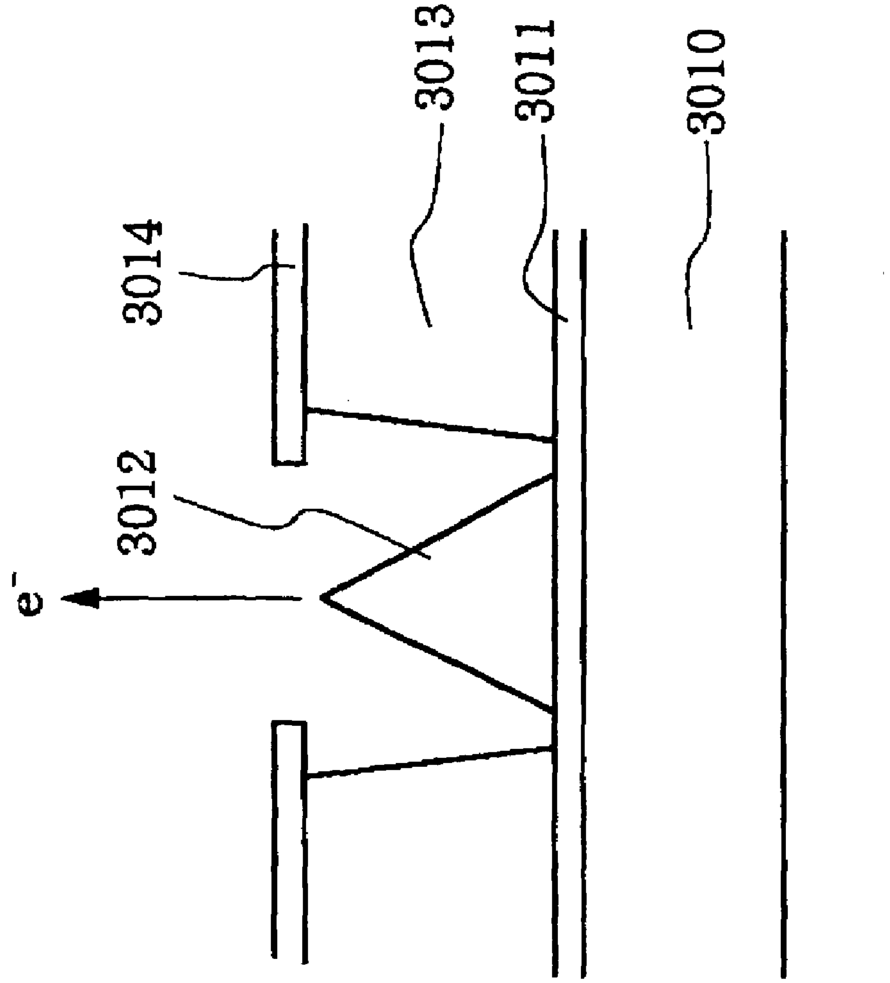
FIG. 5 is a sectional view showing an example of an FE element structure used in the present invention.

FIG. 5 shows an example of the FE element. In FIG. 5, the FE electron emitting element is mainly composed of a substrate 3010, an emitter wiring 3011 formed of a conductive material, an emitter corn 3012, an insulating layer 3013, and a gate electrode 3014. In the electron emitting element, the appropriate voltage is applied between the emitter corn 3012 and the gate electrode 3014 to thereby induce the electron emission from the top of the emitter corn 3012. Also, as an example of another FE element structure, instead of using the laminate structure of FIG. 5, the emitter and the gate electrode are arranged on the substrate in parallel to the substrate plane.

Also, carbon fiber called CNT (carbon nanotube) or GNF (graphite nanofiber) may be provided at the top of the emitter corn 3012. Alternatively, the carbon fiber may substitute for the emitter corn 3012.

Figure 6:
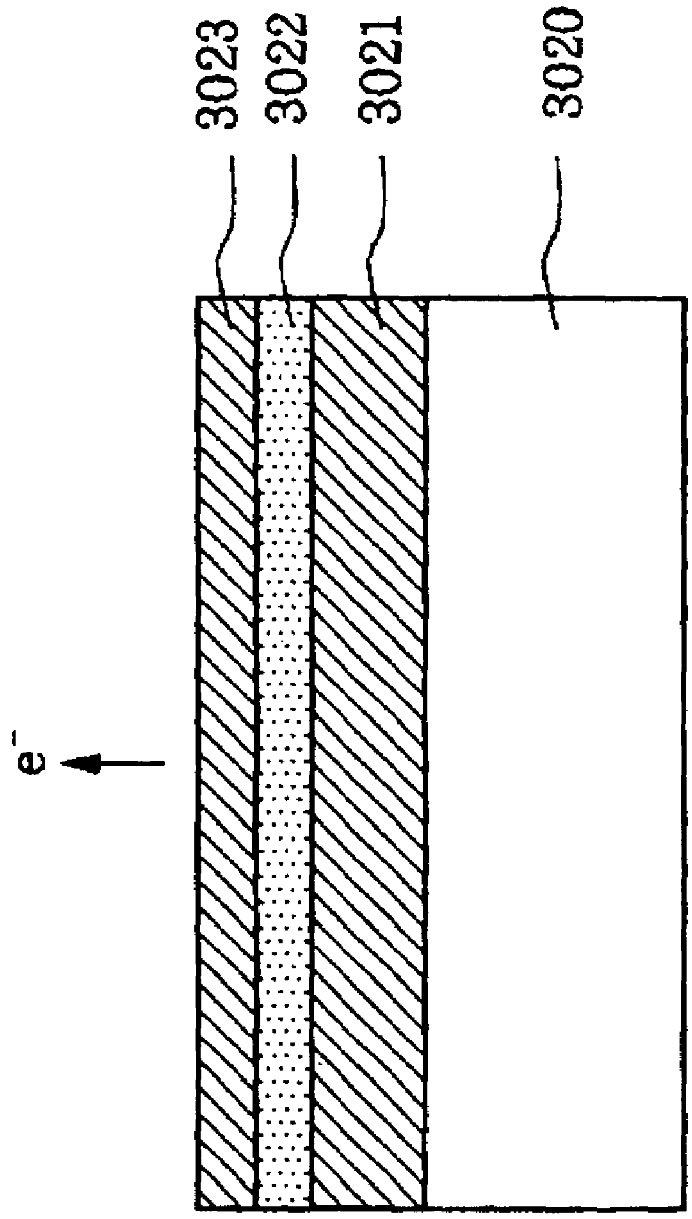
FIG. 6 is a sectional view showing an example of an MIM element structure used in the present invention.

FIG. 6 shows an example of the MIM element. In FIG. 6, the MIM electron emitting element is mainly composed of a substrate 3020, a lower electrode 3021 formed of metal, a thin insulating layer 3022 having a thickness on the order of 100 angstroms, and an upper electrode 3023 formed of metal having a thickness on the order of 80 to 300 angstroms. In the MIM electron emitting element, the appropriate voltage is applied between the upper electrode 3023 and the lower electrode 3021 to thereby induce the electron emission from the surface of the upper electrode 3023.

Embodiment 1

Referring to FIGS. 7 to 22, a description will be given of a driving apparatus and an image display apparatus provided with the driving apparatus in accordance with Embodiment 1 of the present invention.

In this embodiment, as the column driver circuit of a cold cathode display, a circuit that outputs a waveform obtained by using the voltage amplitude modulation and the pulse width modulation in combination is used. The voltage drop of the row selection signal voltage caused by the ON resistance (Ron) of the output transistor in the row driver circuit is corrected by controlling the power source voltage of the row driver circuit through the feedback control by way of example.

Figure 7:
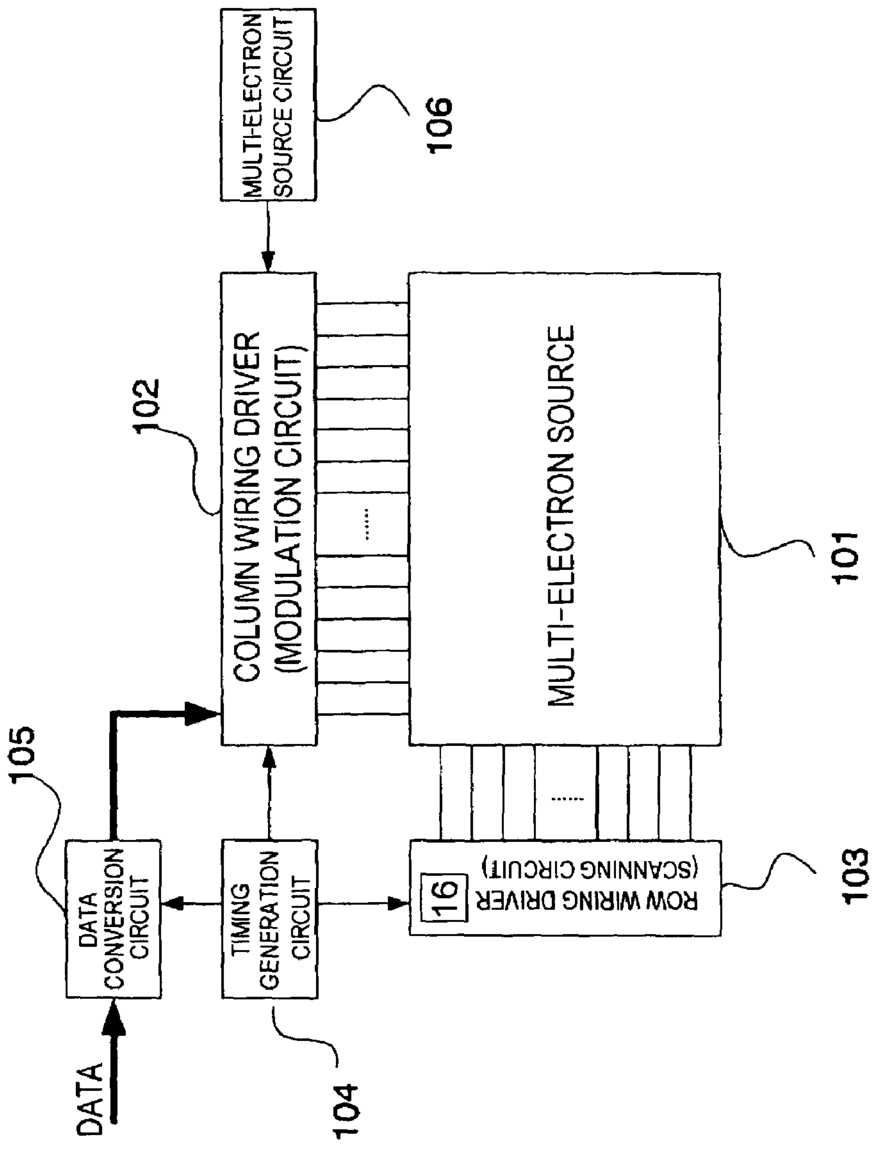
FIG. 7 is a block diagram showing a multi-electron source driver circuit according to Embodiment 1 of the present invention.

First, referring to FIG. 7, a description will be made of the image display apparatus to which the driving apparatus and the driving method in accordance with the embodiment of the present invention are applied. FIG. 7 is a block diagram showing the driver circuit of the multi-electron beam source in accordance with Embodiment 1 of the present invention.

In FIG. 7, the image display apparatus mainly includes: a multi-beam electron source 101 as a matrix panel where the modulation elements are arranged; a column wiring driver (modulation circuit) 102 as a column driver circuit; a row wiring driver (scanning circuit) 103 as a row driver circuit, which includes a correction circuit 16; a timing generation circuit 104 that generates various timing signals such as a clock signal, a load signal, a horizontal synchronizing signal, and a vertical synchronizing signal; a data conversion circuit 105; and a multi-power source circuit 106 adapted to supply multiple reference voltages.

Figure 31:
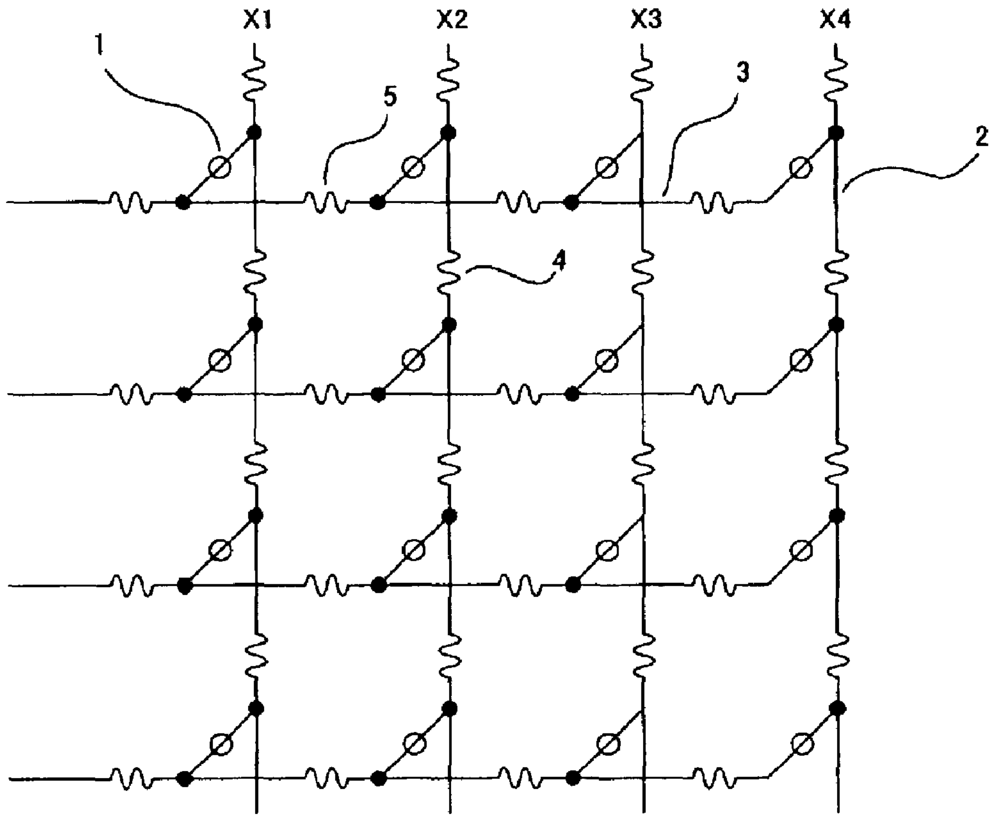
FIG. 31 shows an electrical structure of a matrix panel.
Figure 32:
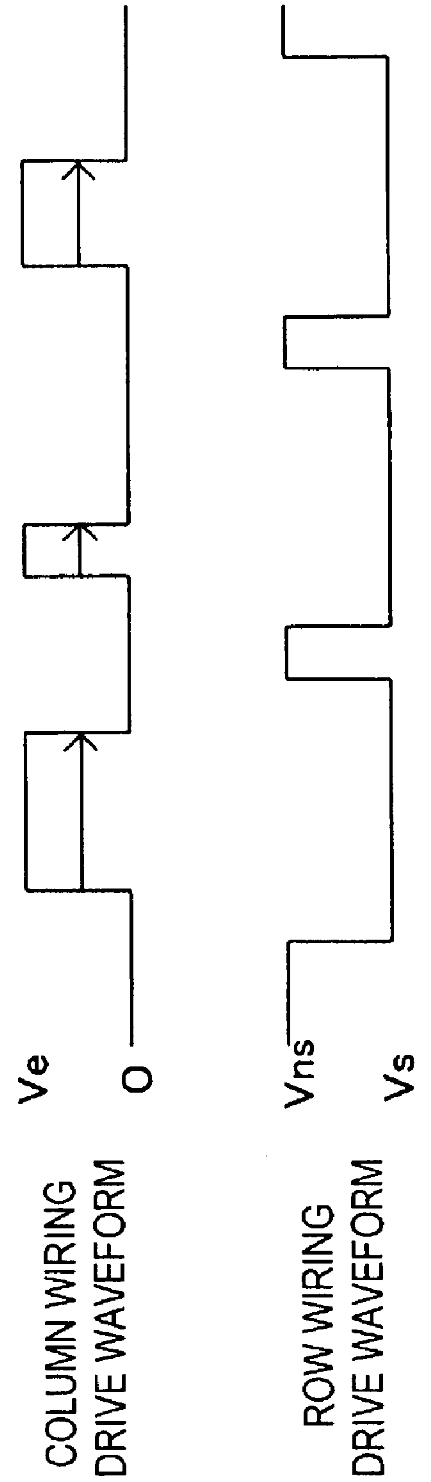
FIG. 32 shows an output waveform of conventional column driver circuit and row driver circuit.

With this structure, the multi-electron beam source 101 is driven. As shown in FIG. 31, the multi-electron beam source 101 is formed such that the electron beam sources (electron emitting elements: display elements) 1 are arranged at intersections of the column wirings 2 and the row wirings 3. The known electron beam sources include SCE, FE, and MIM electron emitting elements as mentioned above. In this embodiment, the SCE electron emitting element is used.

Figure 8:
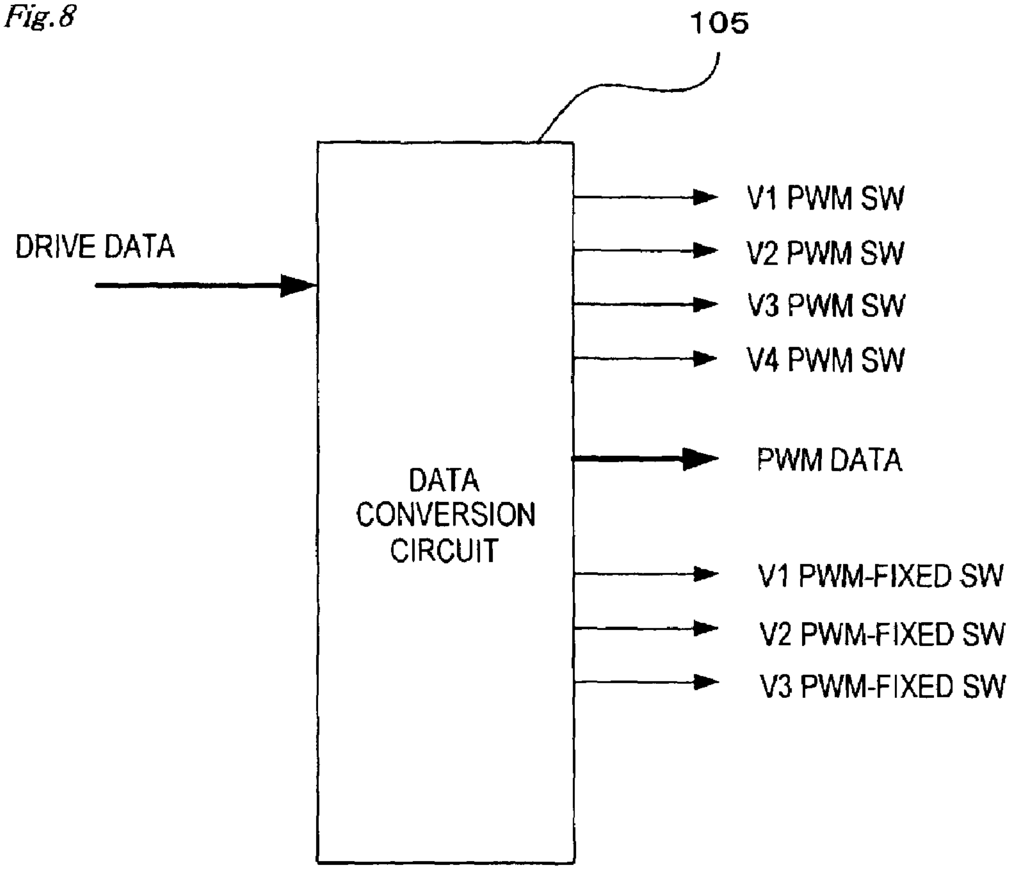
FIG. 8 is a schematic diagram illustrating an operation of a data conversion circuit.

The data conversion circuit 105 converts the drive data used in driving the multi-electron beam source 101 from the outside into a format a suitable for the modulation circuit 102. For example, by using a hardware operational circuit, as shown in FIG. 8, through the 10-bit drive data to be inputted, there are provided outputs inclusive of: outputs of V1PWMSW to V4PWMSW used in selection among four reference voltages V1, V2, V3, and V4 as a reference voltage at the time of pulse width modulation; an output of the PWM data; and outputs of flags V1PWM-fixed SW to V3PWM-fixed SW adapted to determine ON/OFF regarding the usage of stored fixed data as the PWM data of V1PWM to V3PWM.

Figure 9:
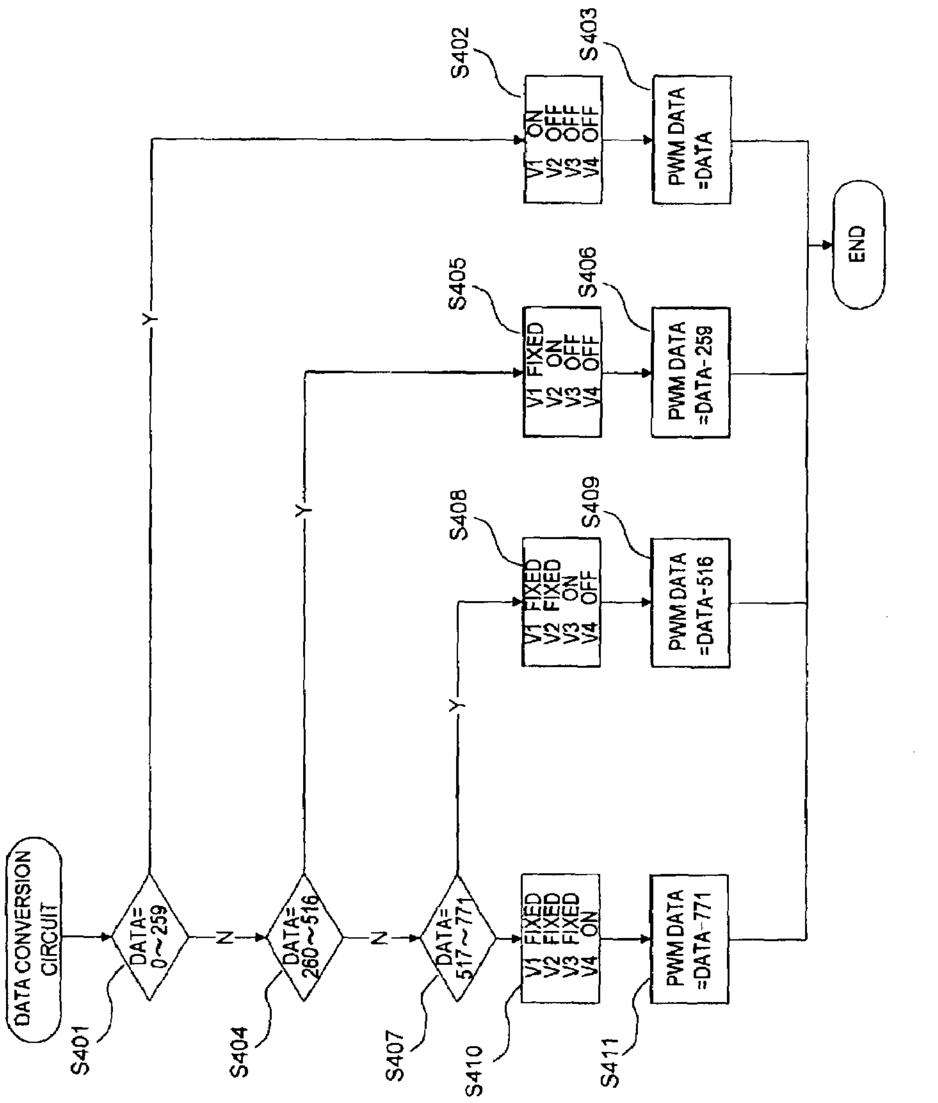
FIG. 9 is a flowchart showing an operation flow of a data conversion circuit.

Based on a flowchart shown in FIG. 9, the operation of the data conversion circuit is described in more detail. The data conversion circuit 105 performs different output operations depending on the value of inputted drive data.

For example, when drive data DATA having the value of 0 to 259 is inputted (S401), only the Output of V1PWMSW is turned ON to perform PWM at the reference voltage V1. The outputs of V2PWMSW, V3PWMSW, V4PWMSW, V1PWM-fixed SW, V2PWM-fixed SW, and V3PWM-fixed SW are turned OFF (S402). By using the value of the inputted drive data DATA, PWM data is computed (S403) before being outputted to a column wiring driver.

When the drive data DATA having the value of 260 to 516 is inputted (S404), the V1PWM-fixed SW is turned ON so that the output at the reference voltage V1 has a fixed pulse width rising at 0 and falling at 259, the output of V2PWMSW is turned ON to perform PWM at the reference voltage V2, and the outputs of V3PWMSW, V4PWMSW, V2PWM-fixed SW, and V3PWM-fixed SW are turned OFF (S405). With the use of the value found by subtracting 259 from the inputted drive data DATA value, the PWM data is computed (5406) before being outputted to the column wiring driver.

When the drive data DATA having the value of 517 to 771 is inputted (S407), the output of V1PWM-fixed SW is turned ON so that the output at the reference voltage V1 has a fixed pulse width rising at 0 and falling at 259, the output of V2PWM-fixed SW is turned ON so that the output at the reference voltage V2 has a fixed pulse width rising at 1 and falling at 258, the output of V3PWMSW is turned ON to perform PWM at the reference voltage V3, and the outputs of V4PWMSW and V3PWM-fixed SW are turned OFF (S408). With the use of the value found by subtracting 516 from the inputted drive data DATA value, the PWM data is computed (S409) before being outputted to the column wiring driver.

When the drive data DATA having the value of 772 to 1023 is inputted, the output of V1PWM-fixed SW is turned ON so that the output at the reference voltage V1 has a fixed pulse width rising at 0 and falling at 259, the output of V2FWM-fixed SW is turned ON so that the output at the reference voltage V2 has a fixed pulse width rising at 1 and falling at 258, the output of V3PWM-fixed SW is turned ON so that the output at the reference voltage V3 has a fixed pulse width rising at 3 and falling at 257, and the output of V4PWMSW is turned ON to perform PWM at the reference voltage V4 (S410). With the use of the value found by subtracting 771 from the inputted drive data DATA value, the PWM data is computed (S411) before being outputted to the column wiring driver.

The column wiring driver 102 is connected to the column wiring of the multi-electron beam source 101 and inputs a modulation signal to the multi-electron beam source 101 depending on the converted drive data from the data conversion circuit 105.

Figure 10:
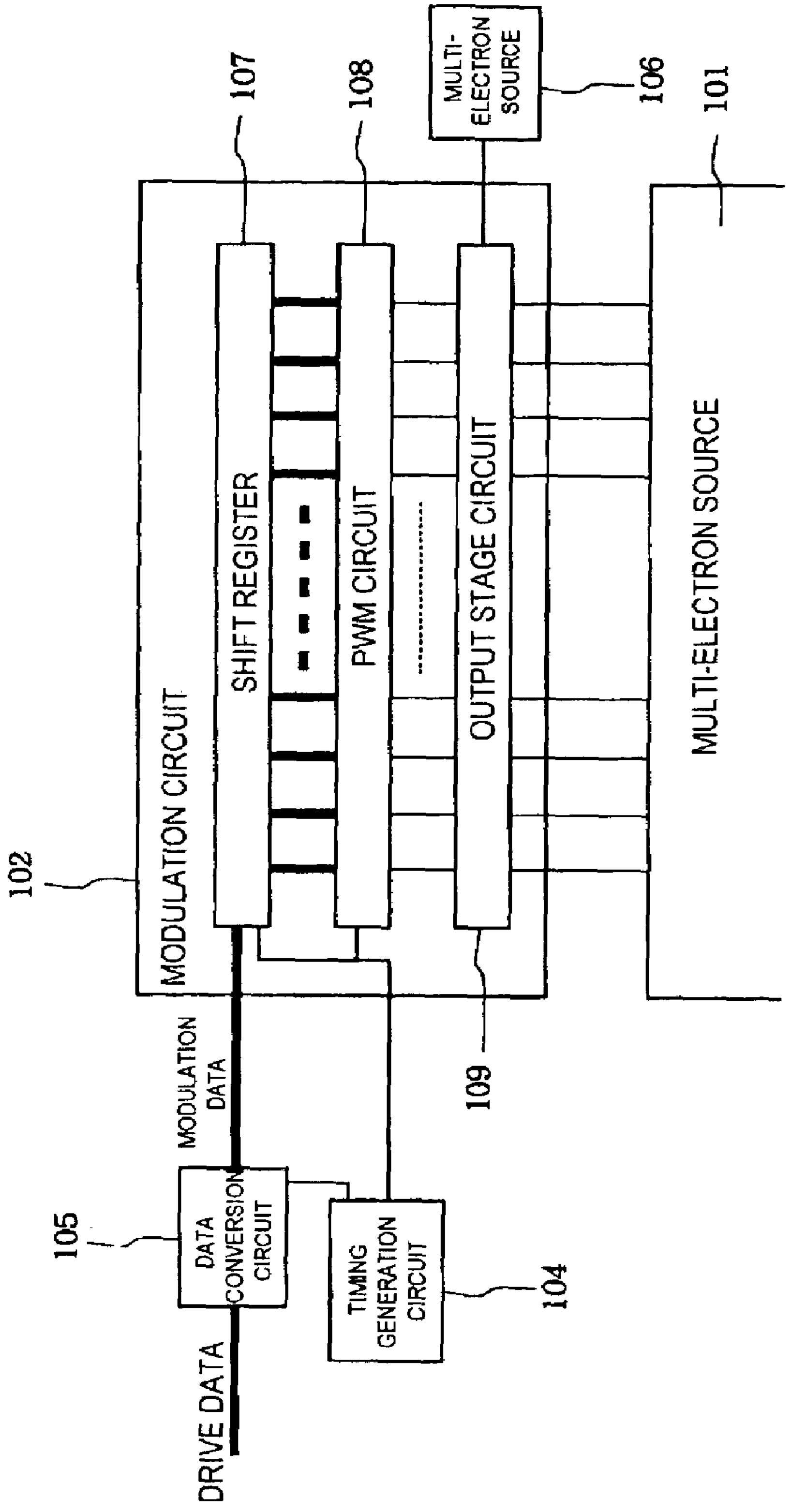
FIG. 10 is a block diagram showing a column driver circuit.

The column wiring driver 102 is described in detail with reference to FIG. 10.

The column wiring driver 102 is composed of the shift register 107, the pulse width modulation (PWM) circuit 108, and the output stage circuit 109.

The shift register 107 shifts the modulation data outputted from the data conversion circuit 105 to a corresponding position in the multi-electron beam source.

Based on the modulation data from the data conversion circuit 105, the PWM circuit 108 and the output stage circuit 109 each output a drive waveform produced by combining voltage amplitude modulation and pulse width modulation, which will be described below.

To cause a display element to emit light at illuminance corresponding to illuminance data, the drive waveform is further controlled with pulse width in unit slot width Ät and also controlled in amplitude in n steps of $A_1$ to $A_n$ (where n is an integer equal to or more than 2 and $0<A_1<A_2< \ldots <A_n$) in each slot. As a feature thereof, the drive waveforms have: a rising portion from amplitude in which the display element is not substantially driven, up to a predetermined amplitude $A_k$ (where k is an integer equal to or more than 2 and equal to or less than n) through the amplitude $A_1$ to an amplitude $A_{k-1}$ in order by at least one slot at a time; and a falling portion from the predetermined amplitude $A_k$ to the amplitude in which the display element is not substantially driven through the amplitudes of an amplitude $A_{k-1}$ to the amplitude $A_1$ in order by at least one slot at a time.

It should be noted here that the slot width Ät refers to a unit time defined by dividing one horizontal period by a maximum slot number S. If the amplitude is constant, the pulse width of the modulation signal is determined by multiplying the slot width by a coefficient corresponding to the gradation information.

Further, a unit drive waveform block which is set based on both the amplitude difference $A_n-A_{n-1}, \ldots, A_2-A_1$ or the difference between the amplitude $A_1$ and amplitude functioning as a drive threshold value of the display element, and the slot width Ät, is added by priority to a position which is lower in the maximum amplitude $A_k$ including a case of K=1 and in which the maximum amplitude continues. Another feature accordingly resides in that amplitude in an arbitrary slot among (k+1)-th slot to (S−k)-th slot is changed from $A_k$ to $A_{k+1}$ when the gradation information is further increased by one gradation with respect to a drive waveform having the slot number of S−2 (k−1) at the maximum amplitude $A_k$ where the above-mentioned drive waveform is produced (assumed that the maximum slot number in one horizontal period is S).

Figure 11:
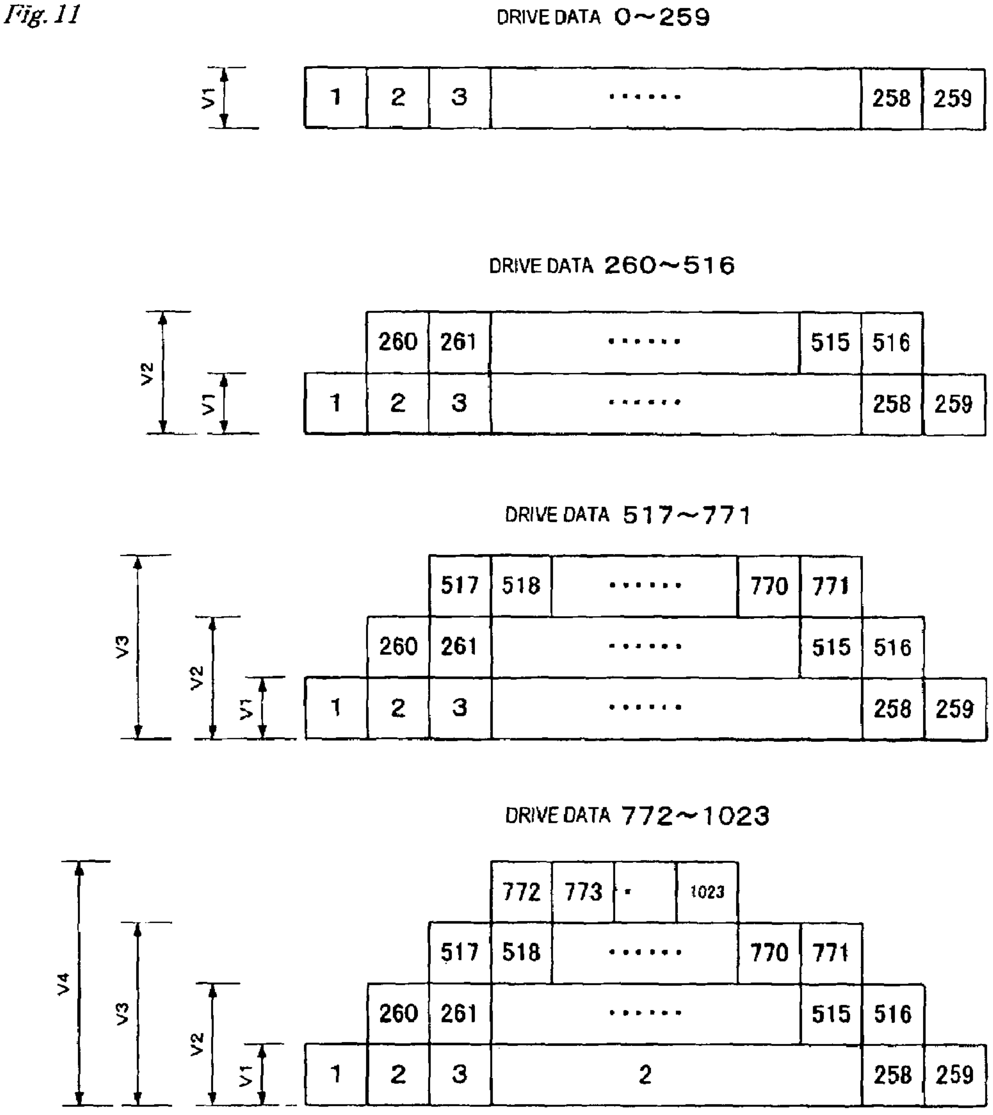
FIG. 11 is an explanatory view showing a relation between a modulation signal waveform and drive data used in the present invention.

FIG. 11 is a diagram for more specifically explaining the relation between the drive waveform and drive data described above.

In a case where the drive data is of 10 bits as shown in FIG. 11, if the drive data value falls within a range of low gradation level from 1 to 259, a circuit producing the above-mentioned drive waveform performs pulse width modulation at the voltage V1. If the drive data value falls within a range of higher gradation level from 260 to 516, the circuit performs pulse width modulation at the voltage V2 at a time being shifted at least by one slot from the PWM stating time at the voltage V1 so that pulse components rise stepwise. If the drive data value falls within a range of still higher gradation level from 517 to 771, the circuit performs pulse width modulation at the voltage V3 at a time being shifted at least by one slot from the PWM stating time at the voltage V2. If the drive data value falls within a range of high gradation level from 772 to 1023, the circuit performs pulse width modulation at the voltage V4 at a time being shifted at least by one slot from the PWM stating time at the voltage V3. In this way, unit pulse components (1023 components at the maximum) are distributed in one horizontal scanning period to be piled up like a pyramid.

Figure 12:
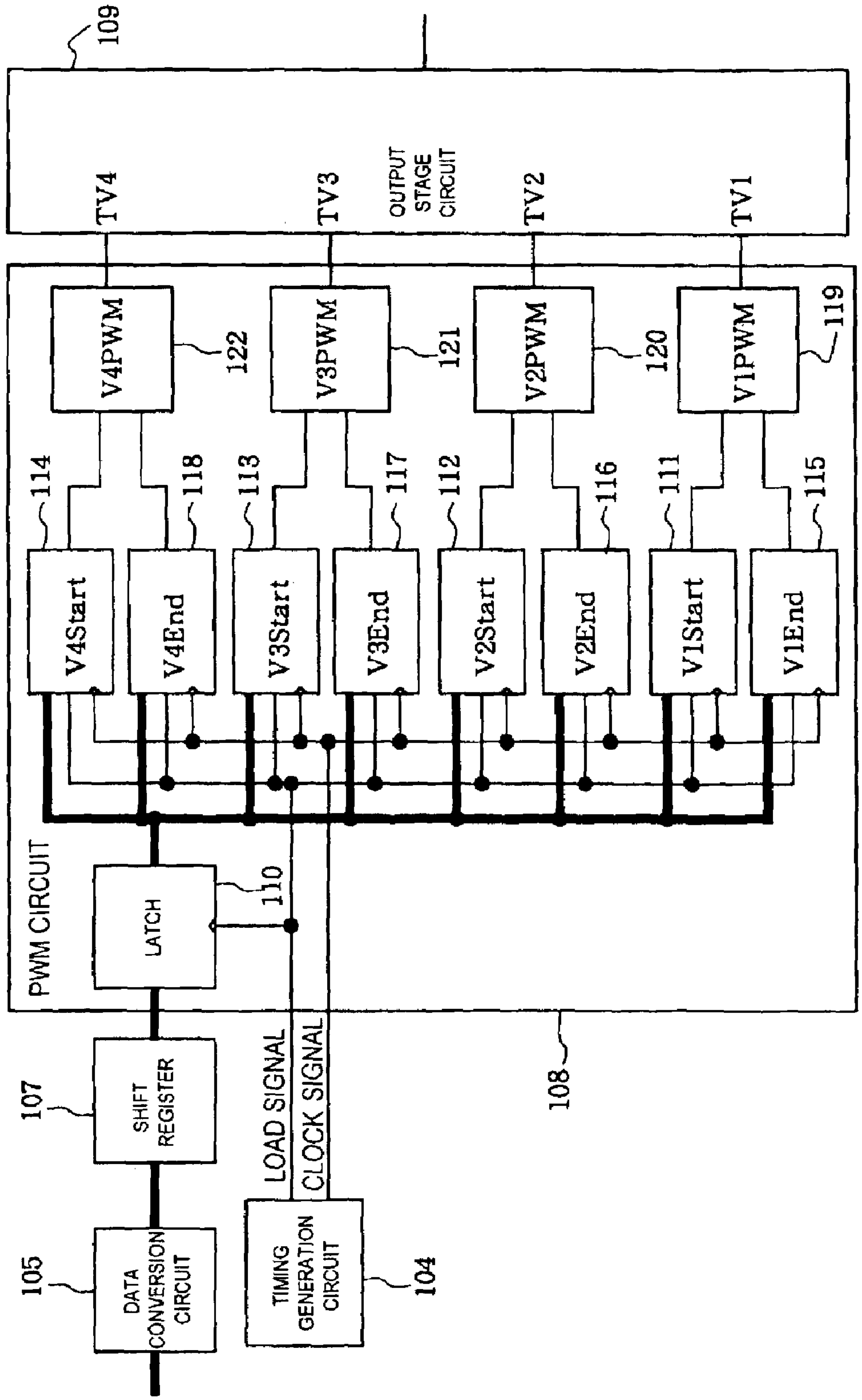
FIG. 12 is a block diagram showing an internal configuration of a PWM circuit.

Next, the PWM circuit 108 and the output stage circuit 109 are described in detail while referring to FIG. 12. FIG. 12 is a block diagram illustrating the internal configuration of the PWM circuit 108.

The output of the data conversion circuit 105 is shifted to a predetermined column by the shift register 107 and taken in the latch 110 in the PWM circuit at a timing of the load signal being outputted from the timing generation circuit 104. For example, when the drive data value is 500 in the range from 260 to 516, PWM data contained in the modulation data is processed in the data conversion circuit 105 and outputted as data having the value of 241 found by subtracting 259 from 500.

Among the data taken in the latch 110, the outputs of V1PWMSW, V3PWMSW, and V4PWMSW are turned OFF The V4 Start circuit 114, V4 End circuit 118, V3 Start circuit 113, and V3 End circuit 117 are turned OFF, and the output of V1PWM-fixed SW is turned ON. Therefore, from a table (not shown) provided in the latch 110 the fixed value of 0 is inputted to the V1 Start circuit 111 whereas from the table (not shown) provided in the latch 110 the fixed value of 259 is inputted to the V1 End circuit 115.

Since the output of V2PWMSW is turned ON, the PWM data of 241 is inputted to the V2 Start circuit 112 and the V2 End circuit 116. The V4PWM generation circuit 122 and the V3PWM generation circuit 121 each receive 0 as the input, and the output therefrom thus becomes 0. As a result, the V1PWM generation circuit 119 rises at the count value of 0 and falls after counting up to 259. The V2PWM generation circuit 120 rises at the count value of 1 and falls at 241. The outputs TV1, TV2, TV3, and TV4 of the V1PWM generation circuit 119, V2PWM generation circuit 120, V3PWM generation circuit 121 and V4PWM generation circuit 122 are inputted to the output stage circuit 109.

Figure 13:
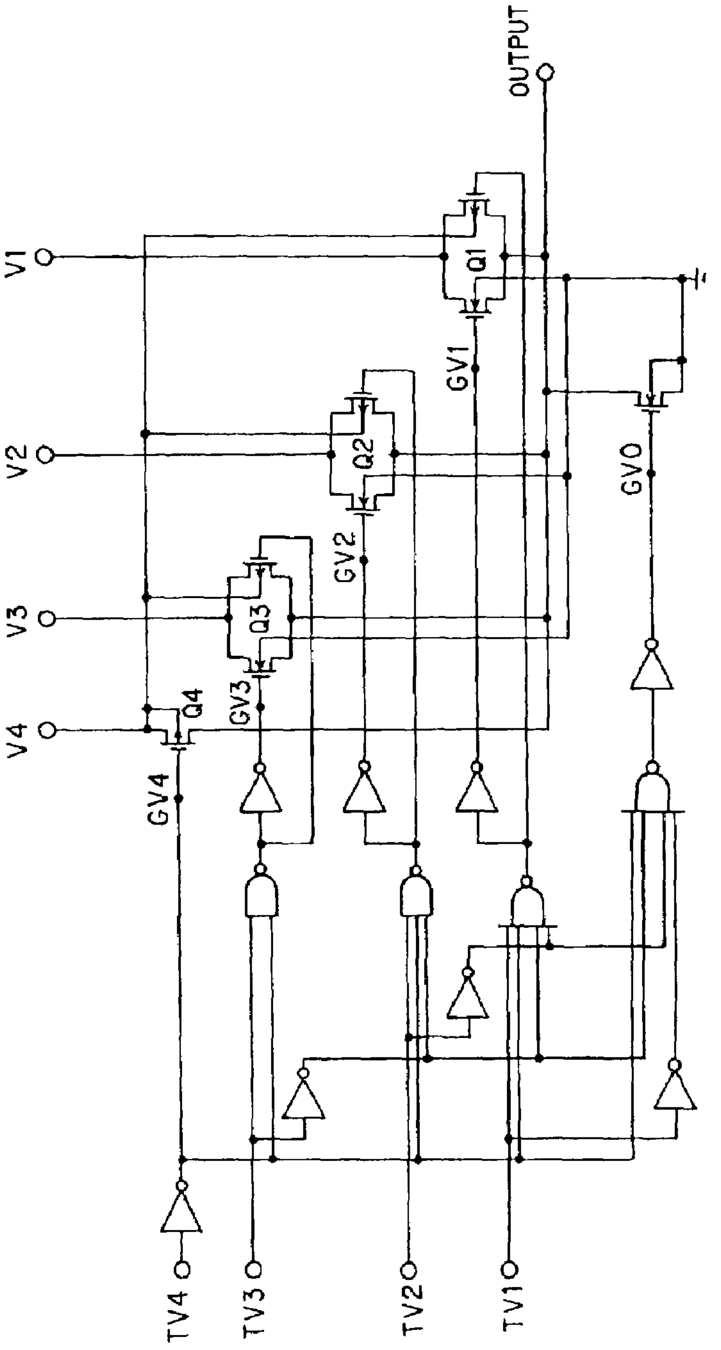
FIG. 13 is a block diagram showing an internal configuration of an output stage circuit in a column driver circuit.

An example of the output stage circuit 109 is shown in FIG. 13. The output stage circuit 109 is composed of logic gates, inverters, and FET switches, as shown in FIG. 13. When the output of TV4 becomes Hi, the output terminal OUTPUT and the V4 input terminal are connected to each other. When the output of TV3 becomes Hi, the output terminal OUTPUT and the V3 input terminal are connected to each other. When the output of TV2 becomes Hi, the output terminal OUTPUT and the V2 input terminal are connected to each other. When the output of TV1 becomes Hi, the output terminal OUTPUT and the V1 input terminal are connected to each other.

The four input terminals (V1, V2, V3, and V4) are supplied with the four reference voltages V1, V2, V3, and V4 generated in the multi-power source circuit 106. The voltages are appropriately adjusted to have the following relation: V4>V3>V2>V1. In this way, such a drive waveform as shown in FIG. 11 is obtained.

To mutually meet the above-mentioned relation, the reference voltages V1, V2, V3, and V4 are appropriately selected in a range from an unselected reference potential, e.g., 0 volt, or larger to "the unselected reference potential +100 volts" or smaller, and more preferably, in a range from an unselected reference potential, e.g., 0 volt, or larger to "the unselected reference potential +20 volts" or smaller. The values of differences of two adjacent reference voltages: |V4−V3|, |V3−V2|, and |V2−V1|, and |V1| may be equal to each other, or those differences may differ from each other to equalize light emission amounts and electron emission amounts in accordance with the reference voltages.

Figure 14:
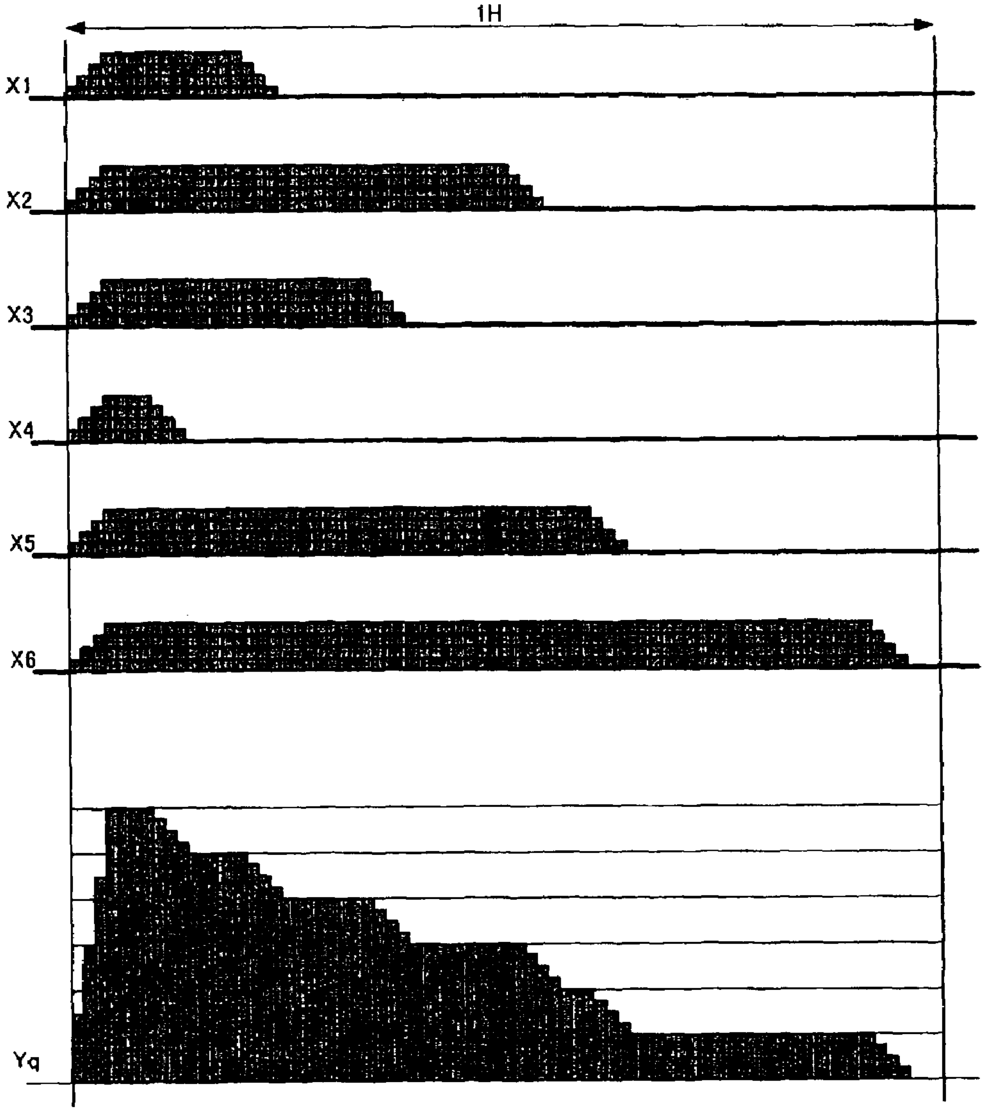
FIG. 14 shows a PWM modulation signal waveform and a waveform of current flowing into a selected row wiring.
Figure 15:
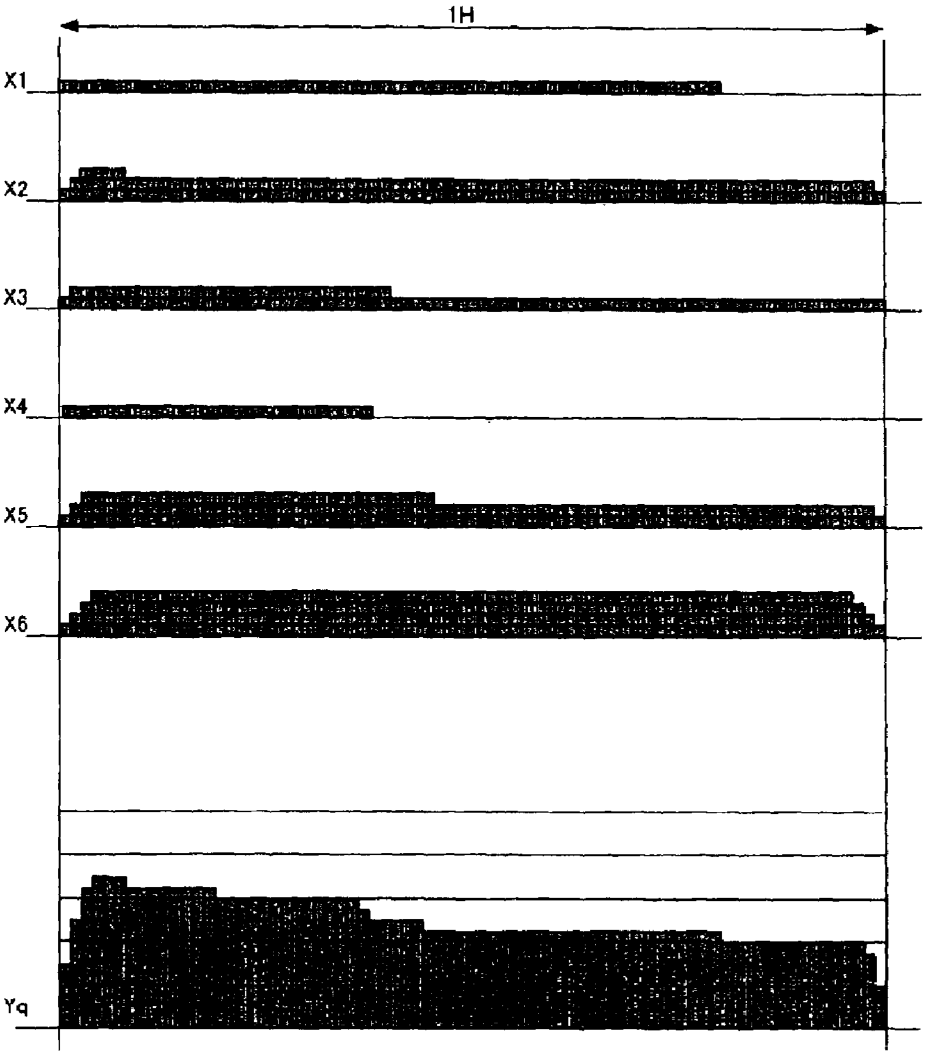
FIG. 15 shows a PWM modulation signal waveform used in the present invention and a waveform of current flowing into a selected row wiring.
Figure 16:
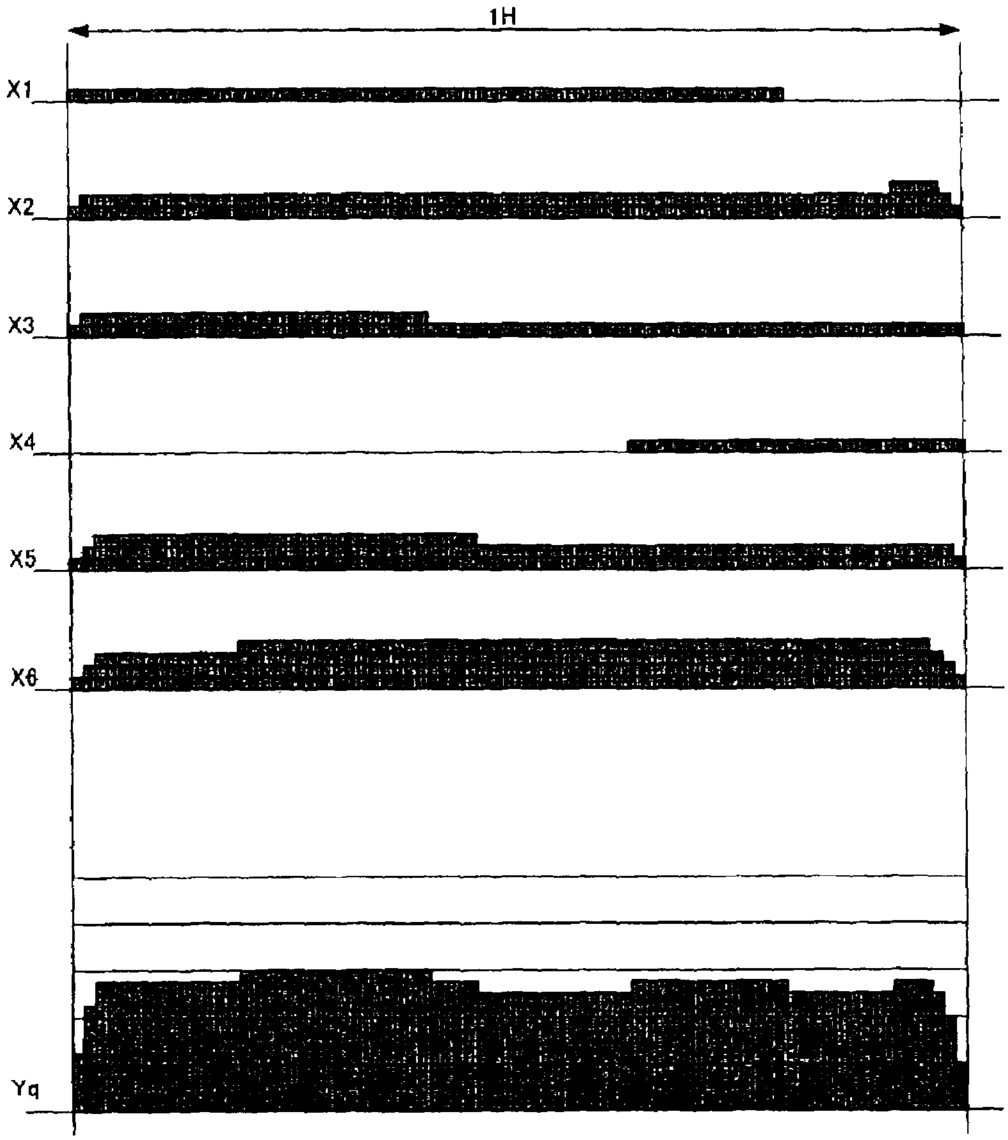
FIG. 16 shows another PWM modulation signal waveform used in the present invention and a waveform of current flowing into a selected row wiring.

Next, depending on the shape of the drive waveform, the changes with time concerning the current amount flowing in a selected row wiring in one horizontal period are compared with reference to FIGS. 14 to 16.

FIG. 14 is a diagram showing the column drive waveforms (X1 to X6) and the waveform (Yq) of a current flowing in the selected row wiring in a case where start reference times of the pulse width modulation are lined up (start synchronous drive).

FIG. 15 is a diagram showing the column drive waveforms (X1 to X6) and the waveform (Yq) of a current flowing in the selected row wiring in a case of a modulation drive in which the pulse width modulation and the voltage amplitude modulation are combined (for convenience, hereinafter referred to as new Vn drive).

FIG. 16 is a diagram showing the column drive waveforms (X1 to X6) and the waveform (Yq) of a current flowing in the selected row wiring in a case where a start reference time of the pulse width modulation in the new Vn drive is set to a start time or an end time of the horizontal scanning period (1H) for every column (combination of start synchronous drive and end synchronous drive).

When the changes with time about the current amount flowing in a selected row wiring in one horizontal scanning period are compared, in a case of the pulse width modulation shown in FIG. 14, the current Yq with a rapid current change flows into the row wiring due to the column wiring drives, e.g., X1 to X6; if the pulse width modulation of the new Vn drive method shown in FIG. 15 is employed, the voltage change in the respective column wiring drives X1 to X6 becomes small, thereby reducing the peak current of the row wiring current Yq flowing in a row wiring driver and suppressing the current change.

Moreover, the current change of the row wiring current Yq is further suppressed by performing the combination drive of the start synchronous drive and the end synchronous drive (start-end synchronous drive), as shown in FIG. 16. In the start synchronous drive, the start reference time of the pulse width modulation in X1 to X6 is set at the start of one horizontal scanning period, and the pulse width is expanded from the left in the drawing as the gradation level increases. In the end synchronous drive, the start reference time of the pulse width modulation is set at the end of one horizontal scanning period, and the pulse width is expanded from the right in the drawing as the gradation level increases.

Although not shown in the drawings, if the pulse width modulation shown in FIG. 14 and the start-end synchronous drive are simply performed in combination, the current concentration is dissipated, thereby suppressing the current change of the row wiring current Yq.

That is, the voltage amplitude of the modulation signal applied to the column wiring is equalized in one horizontal scanning period so that the change of a current flowing in the column wiring in one horizontal scanning period is suppressed. Thus, it is also possible to suppress even the change of a current flowing from plural column wirings to one row wiring selected (or flowing from the selected row wiring to the plural column wirings).

In this way, when the unit pulse components are continuously or evenly distributed in one horizontal scanning period, or when the distribution is performed to vary the positions of the unit pulse components in one horizontal scanning period for every column wiring, the rapid change of the current flowing in the row wiring can be suppressed. As described above, "the distribution of the unit pulse components" in the present invention refers to a case where the start-end synchronous drive is performed or a case where the drive waveform is determined so as to expand the pulse width by priority instead of increasing the voltage amplitude upon the application of the voltage amplitude modulation and the pulse width modulation in combination, for example. Thus, the term is not limited to the meaning in which the unit pulse components are dispersed and distributed in one horizontal scanning period.

After suppressing the change in current flowing in the selected row wiring in the above-mentioned manner, there is performed output voltage correction of the row wiring driver, in other words, ON resistance correction (Ron correction), which will be described below.

Figure 17:
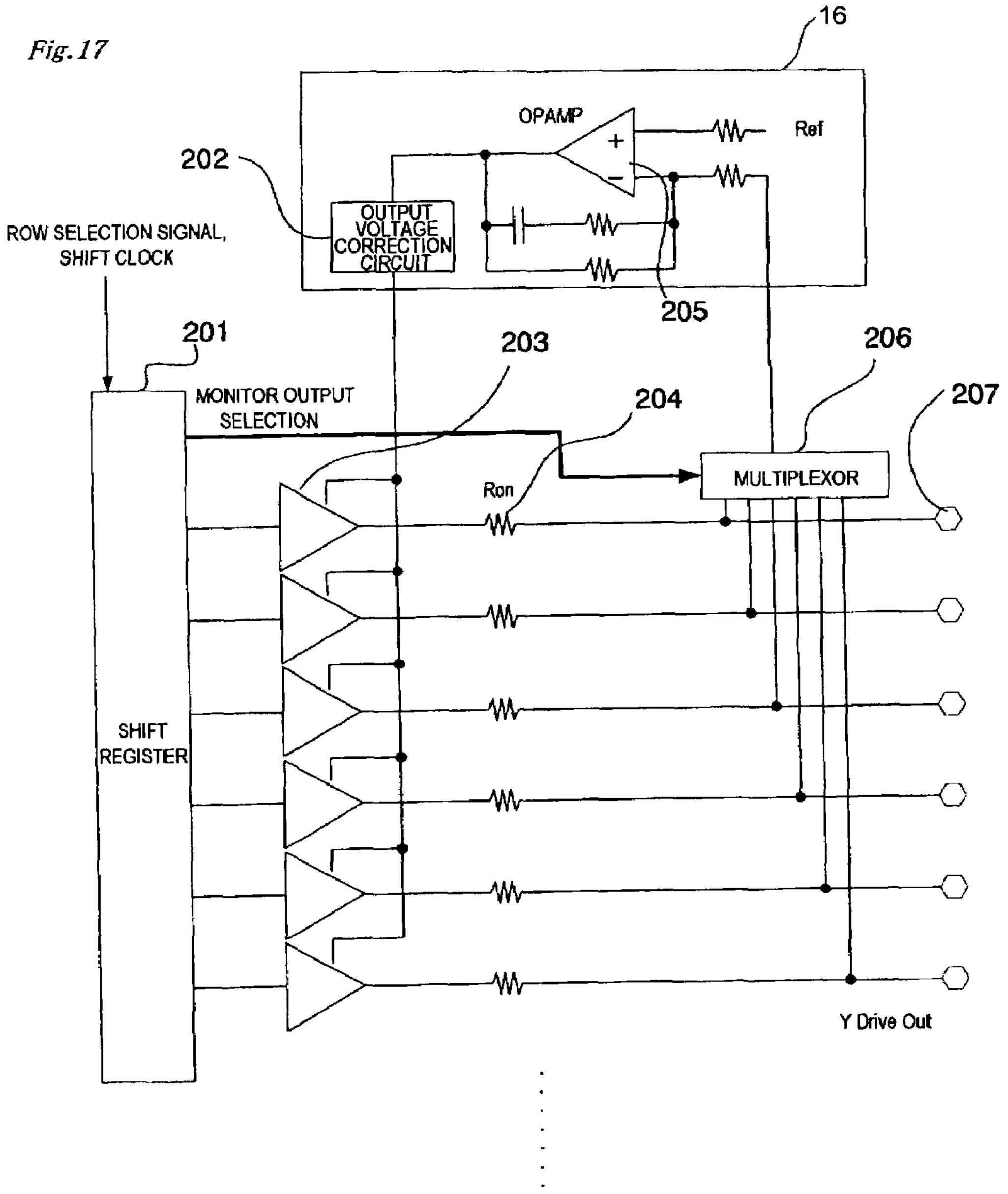
FIG. 17 is a block diagram showing a row driver circuit according to Embodiment 1 of the present invention.

The row selection driver 103 is connected to the row wiring of the multi-electron beam source 101. The row selection driver 103 is described with reference to FIG. 17. FIG. 17 is a block diagram showing the Ron correction circuit 16 of the row wiring driver according to this embodiment.

A shift register 201 shifts inputted row selection signals sequentially from top at a timing of the shift clock. The output of the shift register 201 is converted in voltage to a voltage defined by the output voltage of an output voltage correction circuit 202 and also converted in current at the same time by an output buffer 203 before being supplied to a row wiring of a matrix electron beam source through an output terminal 207 of a row wiring driver.

The value of a driver ON resistance (Ron) 204 of the output buffer 203 needs to be as small as several hundreds of mÚ or smaller in order to suppress the voltage drop due to the ON resistance to an allowable level.

Through the output terminals 207, column wirings 2, electron beam source 1, and row wirings 3, currents from all column wiring drivers flow in the output buffers 203.

Accordingly, when 1 mA-current flows in every channel (one dot), for example, a current of 1 mA×640 dots×3 (RGB)=1920 mA flows in VGA.

Up to now, as the output buffer 203, there is employed a discrete power MOSFET or a buffer having a small output ON resistance with a large output if it is integrated with shift registers etc. Thus, the row driver circuit results in being manufactured in the form of a hybrid IC or an IC with a large chip area, which leads to high costs.

In this embodiment, since feedback control of the output buffer is performed, a low-cost IC capable of suppressing variations in output voltage can be provided. Hereinafter, as an example, a case of a matrix panel having a display element for VGA will be described.

First, 480 rows are divided into 6 modules, each module is provided with a feedback circuit, and the feedback control is performed on the output buffer 203 corresponding to 80 rows.

In FIG. 17, the output is made from the first row, the voltage drop occurs in the output buffer 203 due to the ON resistance 204.

As to the ON resistance, in a case of a high withstand voltage MOS process IC, for example, it is necessary to connect in parallel a number of double diffusion structure transistors (DMOS transistors), and thus the chip size needs to be large to some extent. Further, when an attempt is made to reduce the chip size as much as possible, the ON resistance becomes about 0.5 Ú to several Ú. Therefore, in a case where the column wiring driver allows a current of 1 mA to flow per output, since there are 640 dots×3 (RGB)=1920 outputs as a whole, a current of about 2 A flows. As a result, the voltage drop of about 1 V occurs even when the ON resistance is 0.5 Ú.

A multiplexor 206 serving as a switch performs switching based on row information (row selection information) of a monitor output selection signal, and outputs potential information of an output terminal 207 of the first row to an operational amplifier 205 serving as a control circuit. The multiplexor 206 operates for the sake of obtaining a detection potential of the output terminal 207. Therefore, it is not necessary to lower the resistance value, and the resistance value may be as large as several tens of KÚ. Thus, the proportion of the switch of the multiplexor 206 occupied in the entire IC is considerably small.

Figure 18:
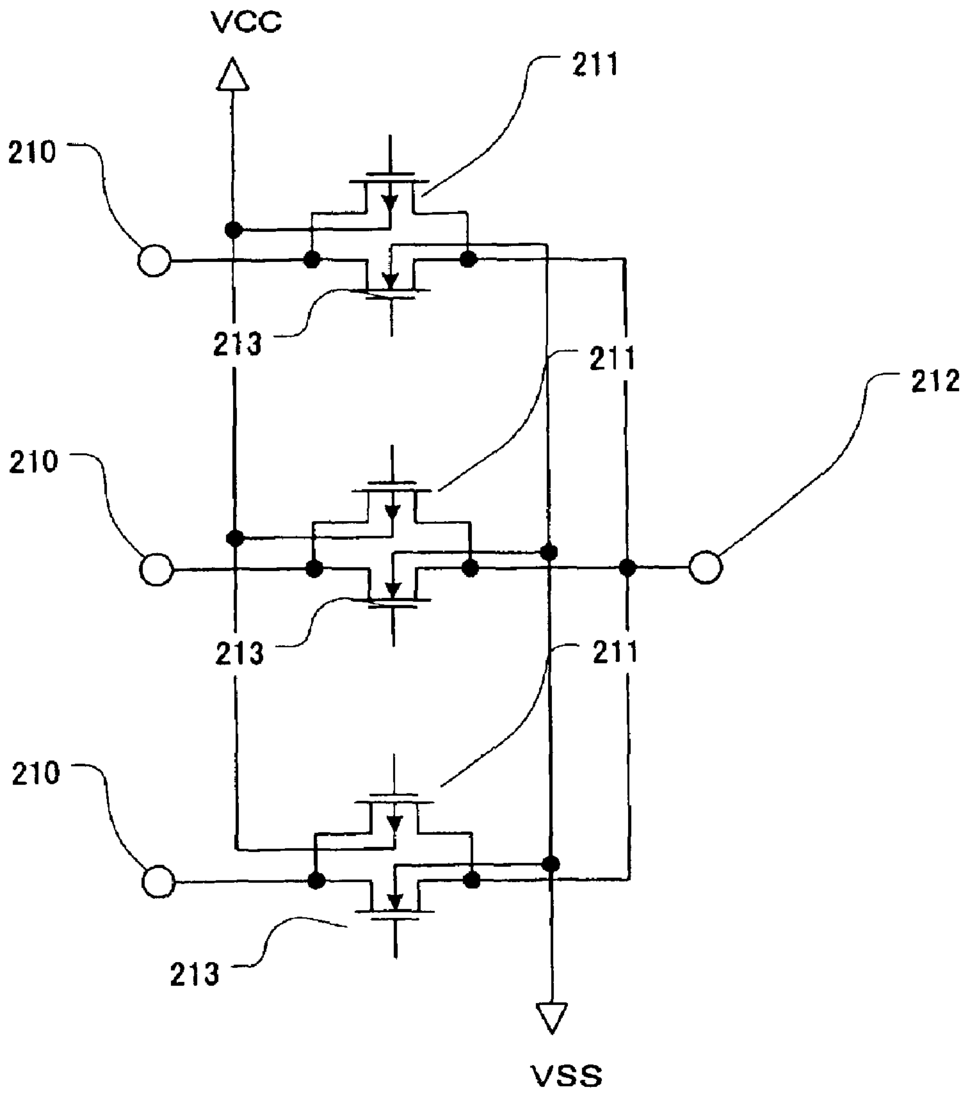
FIG. 18 is a circuit diagram showing a multiplexor.

The multiplexor 206 can be manufactured in CMOS process for example. FIG. 18 is a circuit diagram of the multiplexor 206 manufactured in the CMOS process.

A CMOS switch composed of a p-channel FET 211 and an n-channel FET 213 is used. The CMOS switch (211, 213) is connected to each input 210, selects the input depending on which CMOS switch gate is turned ON, and outputs potential information to an output terminal 212.

The output from the multiplexor 206 is amplified by the operational amplifier 205 and inputted as a correction signal to every output buffer by the output voltage correction circuit 202. However, only the first row is used to drive the matrix, and therefore output drivers except for the one for the first row are turned OFF. In this way, feedback process is performed for the selected first row, the above-mentioned voltage drop is corrected to increase the voltage by the correction signal, and the voltage drop due to the output current can apparently be suppressed to a lower level.

Figure 19:
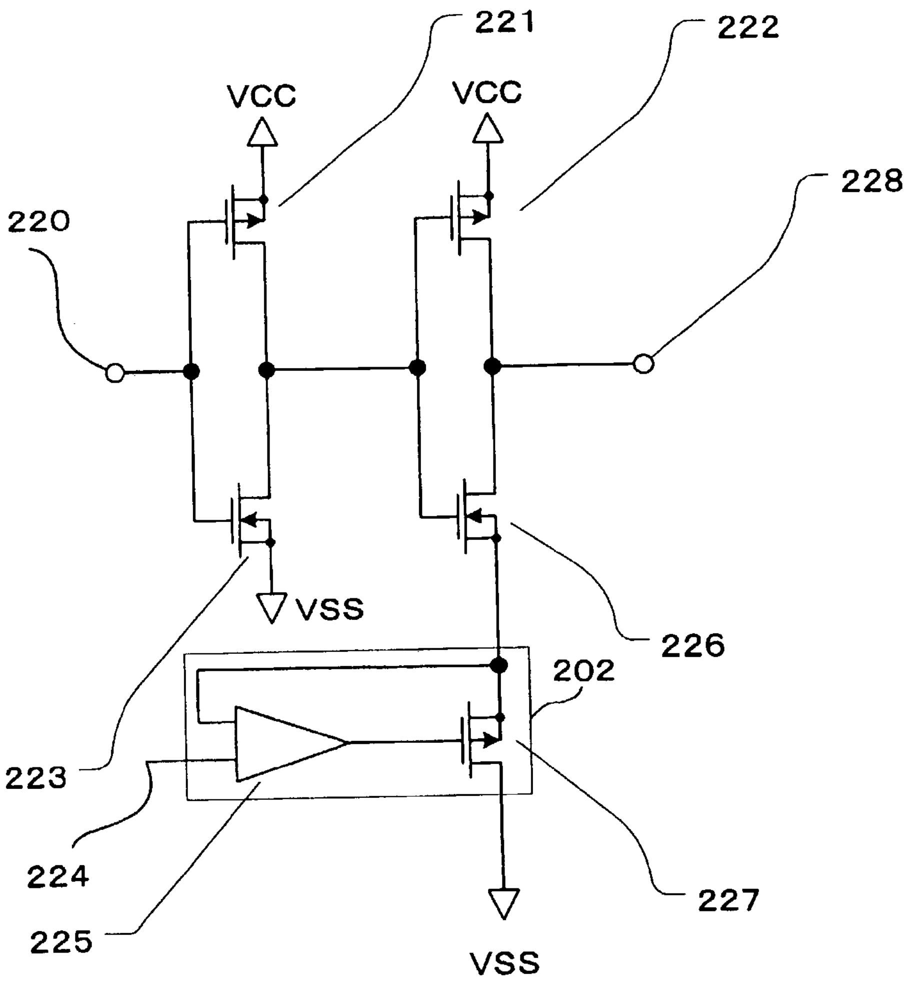
FIG. 19 is a circuit diagram showing an example of an output buffer and an output voltage correction circuit.
Figure 20:
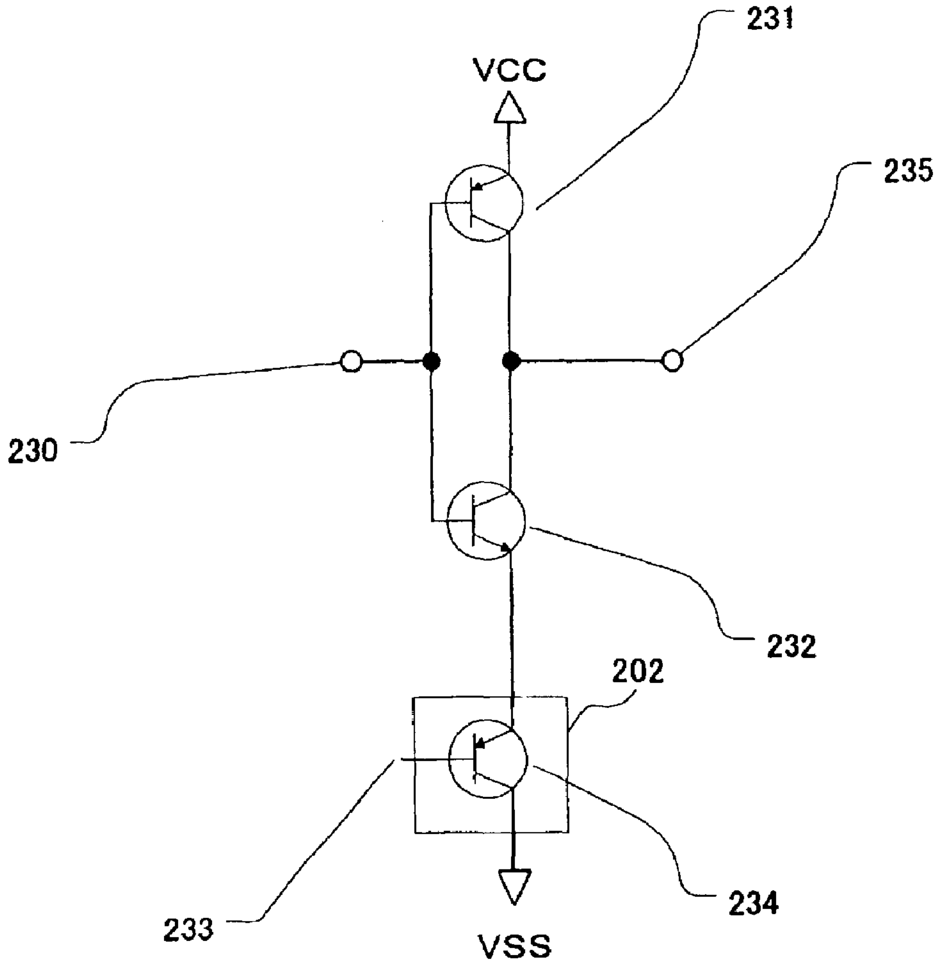
FIG. 20 is a circuit diagram showing another example of an output buffer and an output voltage correction circuit.

Next, the output buffer 203 and the output voltage correction circuit 202 are described with reference to FIGS. 19 and 20. FIG. 19 shows the circuit configuration of the CMOS process. FIG. 20 shows the circuit configuration of bipolar process.

When Vcc on the high potential side is selected and outputted, for example, this becomes a row non-selection signal. On the other hand, when Vss on the low potential side is selected and outputted, this becomes a row selection signal used to select a row. When V1 to V4 are positive, it is preferable that Vss become a negative potential, and Vcc become an unselected reference potential like 0 volt or a positive potential.

To be specific, Vss can be selected in a range from "the unselected reference potential—3 volts" to "the unselected reference potential—100 volts", and more preferably, from "the unselected reference potential—5 volts" to "the unselected reference potential—20 volts".

Vcc is the above-mentioned unselected reference potential and may have an arbitrary value. For example, the potential value can be selected in a range from 0 volt to +100 volts, and more preferably, from 0 volt to +20 volts. It is needless to mention that the polarity of the transistors and the polarity of V1 to V4, Vcc, and Vss can completely be inverted. In this case, as will be understood by a person having ordinary skill in the art, the direction in which a current flows is just inverted so that the equivalent effect can be achieved.

Vss is corrected and outputted from the output terminal so as to become a row selection signal as will be described in detail hereinafter.

Although not shown in the drawings, when two rows are selected at the same time, row selection signals outputted to two rows are concurrently corrected by one of correction circuits. In the case of row selection signal with a accuracy of from 1 micro volts to 6 milli volts, row selection signals outputted to two rows are concurrently corrected by two correction circuits independently.

In a case of the CMOS circuit shown in FIG. 19, due to a large gate capacitance of the output buffer, the waveform of a drive signal inputted to an input terminal 220 is amplified in current by a CMOS pre-buffer composed of a p-channel FET 221 and an n-channel FET 223. The drive signal waveform amplified in current is added to a CMOS output buffer gate composed of a p-channel FET 222 and an n-channel FET 226 to drive an output terminal 228. The output voltage at the time of row selection in this case is determined by a source voltage of the FET 226 of the output buffer, namely, the reference voltage source Vss and a gate potential of an FET 227 functioning as the output voltage correction circuit.

Here, Vgs (gate-source voltage) of the FET 227 is not so stable that an operational amplifier 225 is provided, and the voltage feedback operation is performed thereby. Accordingly, the output voltage correction at the time of row selection is enabled by adding the correction signal from the operational amplifier 205 to an input terminal 224 of the operational amplifier 225.

In a case of the bipolar circuit shown in FIG. 20, the drive waveform inputted to an input terminal 230 is then inputted to a base of an output buffer composed of a PNP transistor 231 and an NPN transistor 232.

The output voltage at the time of row selection at an output terminal 235 is determined by an emitter voltage of the NPN transistor 232, that is, a base potential of a PNP transistor 234 serving as the output voltage correction circuit. Accordingly, the output voltage correction at the time of row selection is enabled by adding the correction signal from the operational amplifier 205 to a base (input terminal 233) of the PNP transistor 234.

By combining a column driver waveform with the modulation method in which pulses are distributed in the above-mentioned manner, such as the new Vn drive, and the Ron correction circuit, the error caused in the Ron correction can be further reduced significantly.

Figure 21:
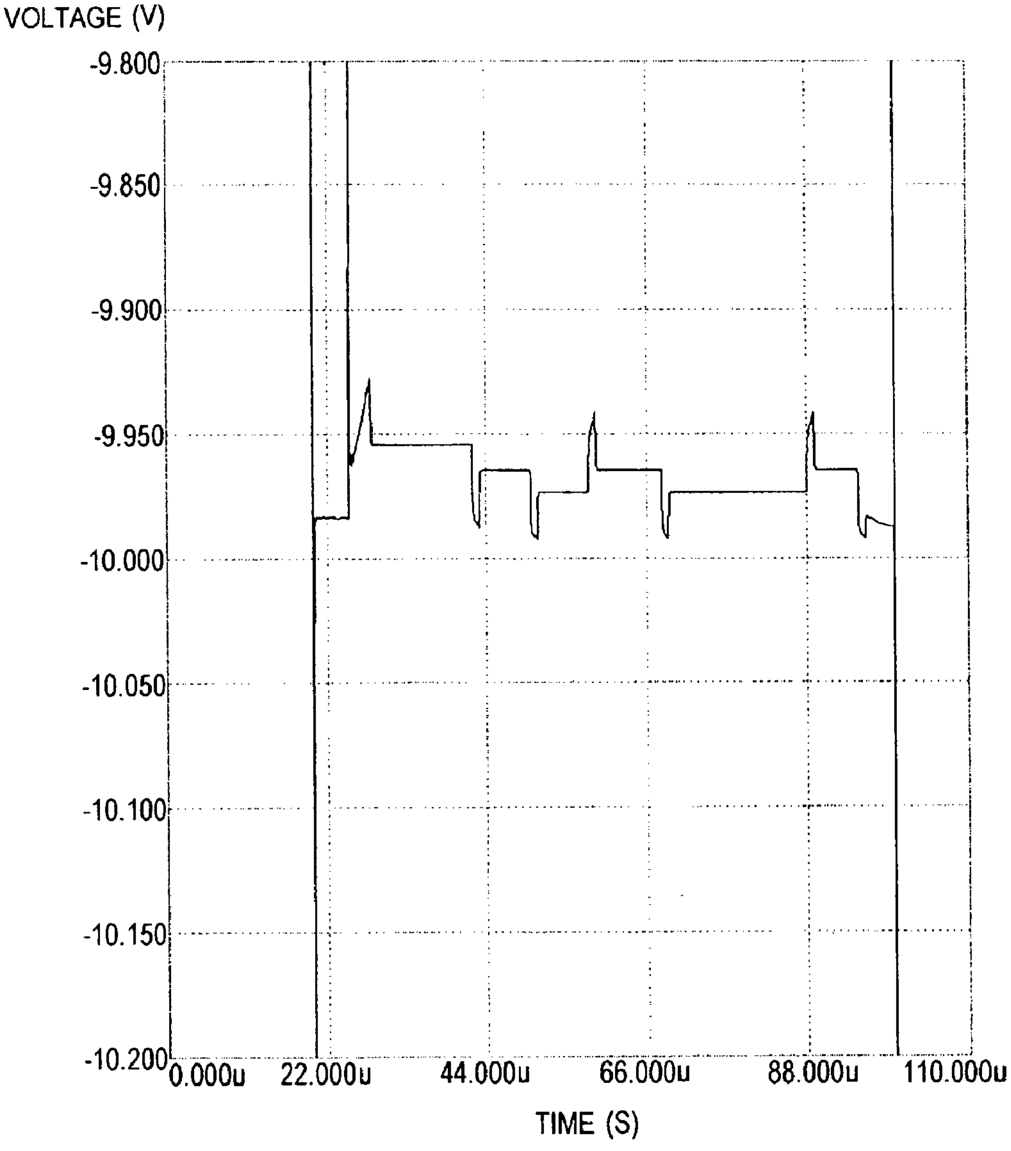
FIG. 21 shows a voltage output of a row driver circuit according to Comparative Example.
Figure 22:
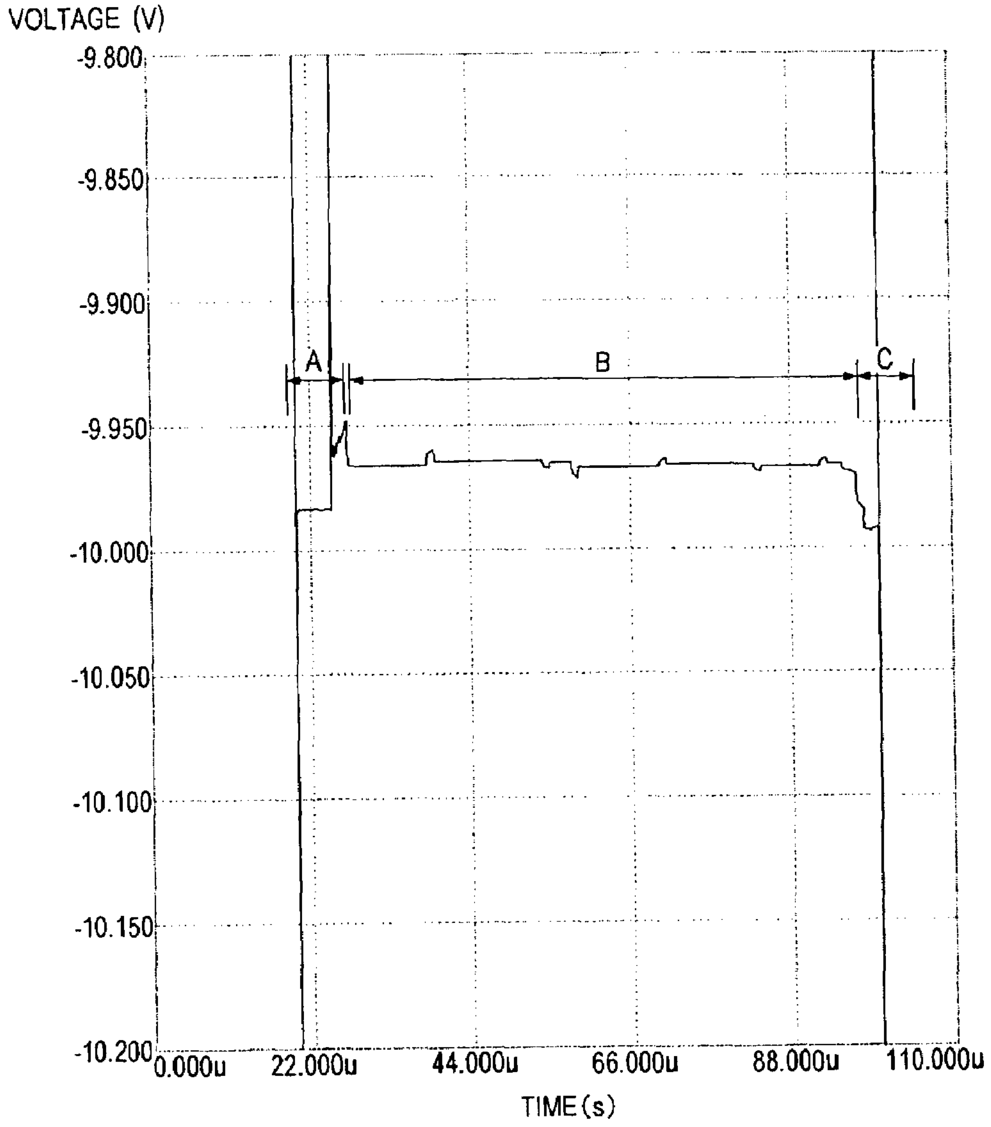
FIG. 22 shows a voltage output of a row driver circuit according to an embodiment of the present invention.

FIG. 21 is a diagram showing the change in voltage of the output terminal of the row driver circuit due to the column drive waveform shown in FIG. 14. On the other hand, FIG. 22 is a diagram showing the change in voltage of the output terminal of the row driver circuit due to the column drive waveform shown in FIG. 16. It is understood that the error caused in the output voltage due to the ON resistance and a current flowing in the row wiring is suppressed by the distribution of pulses in the time direction.

In the vicinity of one horizontal scanning period, the inevitable large change in voltage amplitude due to the rising and falling of pulses is observed. However, its time duration is extremely short, and the illuminance change is not so obvious to be appreciated so that this is not a problem for the image when being displayed.

As a result, the performance required for the circuit can be eased, which leads to a further reduction in costs.

Embodiment 2

Another embodiment will be described below. The basic structure is the same as that of Embodiment 1.

In FIG. 22, a few errors of the row wiring drive voltage output occur in a period B, but more correction errors occur in periods of A and C.

Figure 23:
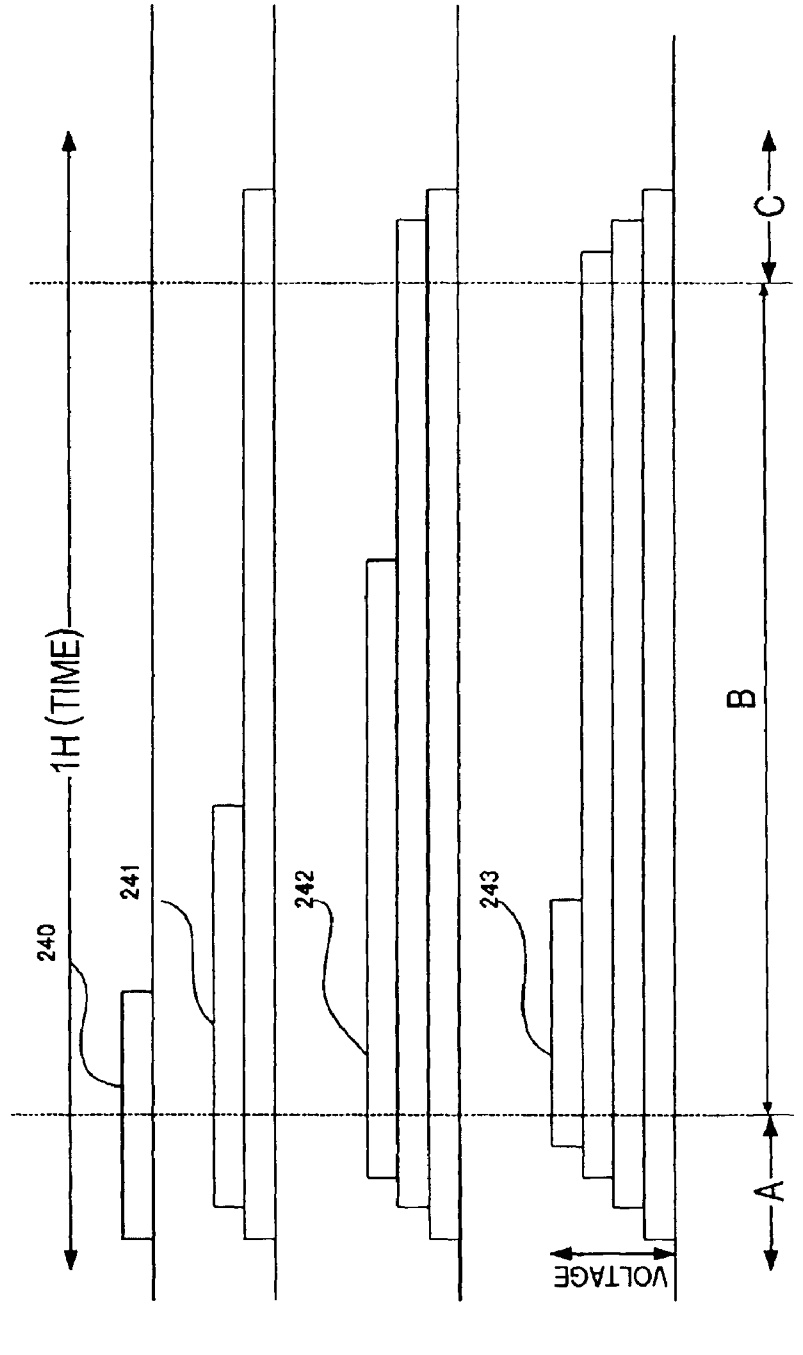
FIG. 23 shows a modulation signal waveform used in the present invention.

As shown in FIG. 23, the new Vn drive described above employs a method in which the drive voltage of the row wiring is raised in the amplitude direction sequentially from a waveform 240 to waveforms 241, 242, and 243, in accordance with the inputted drive data. In the period B of FIG. 23, since the change in voltage amplitude is small, the change in current in one horizontal scanning period in the row wiring is extremely small.

On the other hand, in the periods A and C of FIG. 23, since the change in voltage amplitude becomes large depending on the drive data, the correction error in the periods A and C of FIG. 22 becomes large. To cope with this, it is effective to also cover the Ron correction circuit with a window mask.

Figure 24:
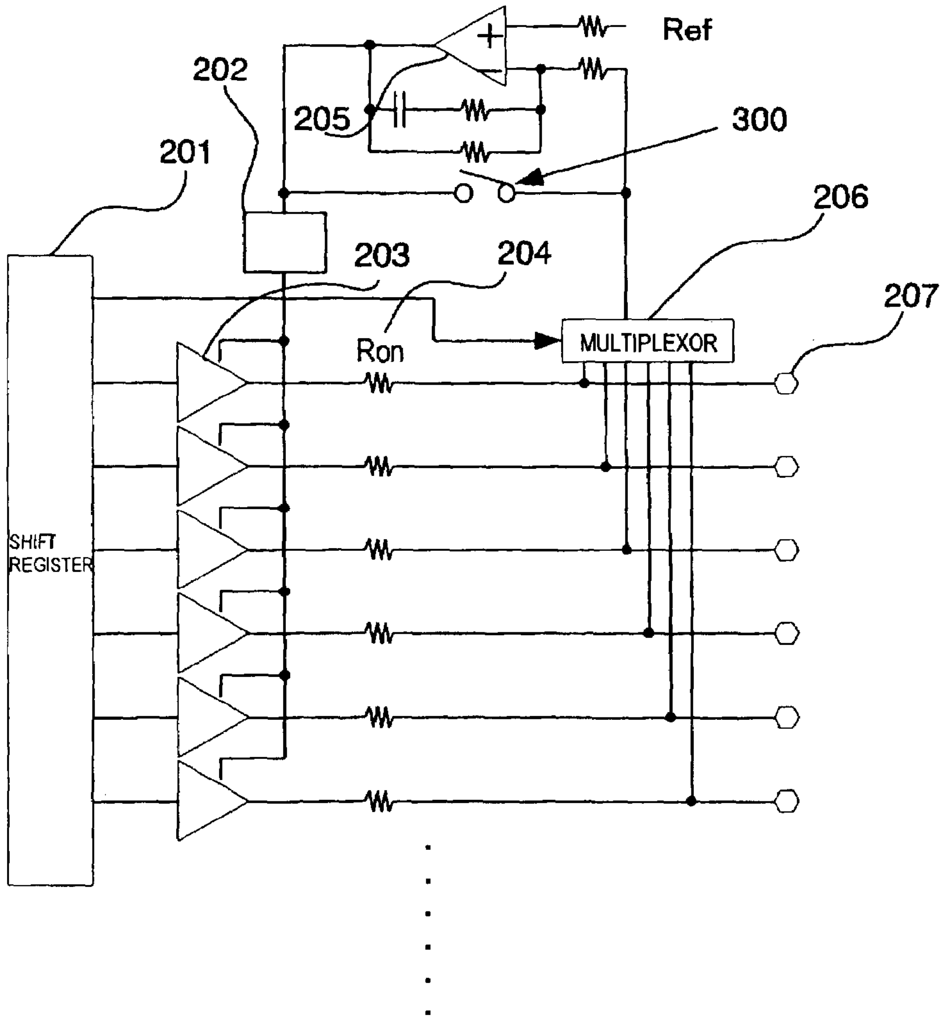
FIG. 24 is a block diagram showing a row driver circuit used in another embodiment of the present invention.
Figure 25:
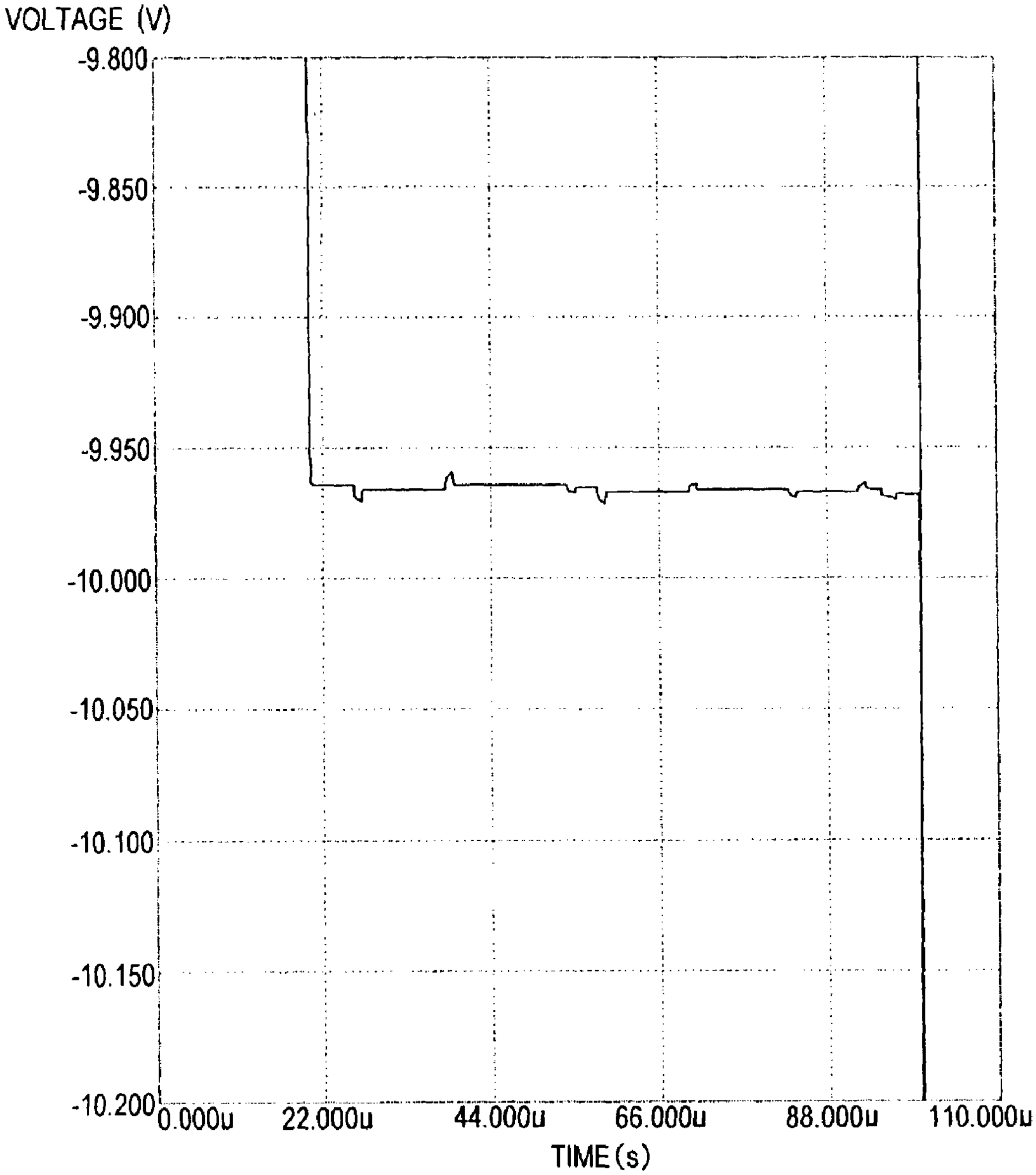
FIG. 25 shows a voltage output of a row driver circuit.

The window mask is realized by providing a switch 300 for turning ON/OFF for the correction, as shown in FIG. 24. The switch 300 turns OFF only in the period B to effect the correction only in the period B of FIG. 23. In this way, the row wiring drive voltage output of FIG. 25 is obtained by using the window mask.

Embodiment 3

Figure 26:
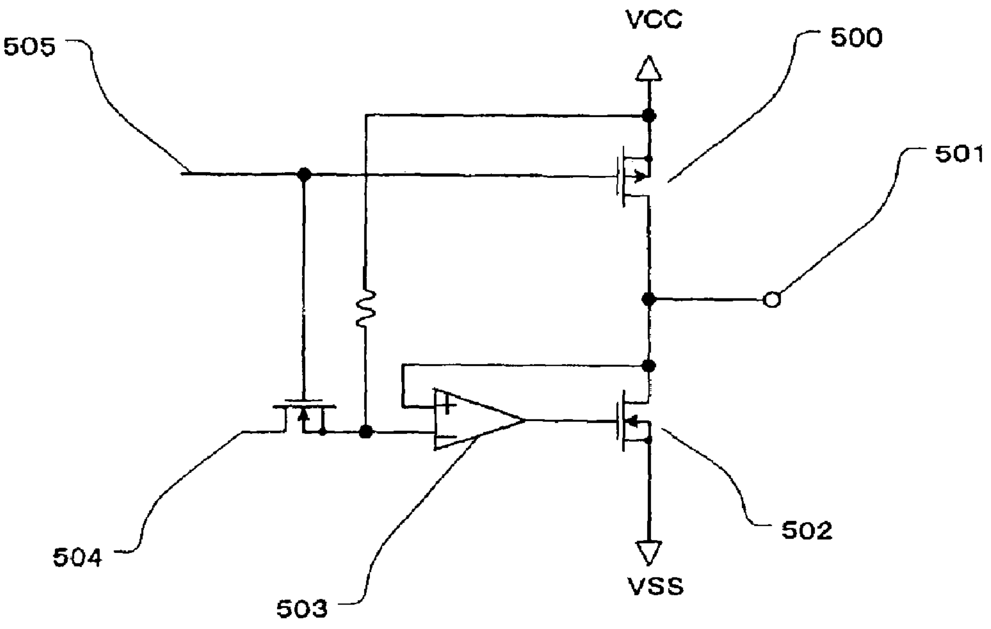
FIG. 26 is a circuit diagram showing an output buffer and a correction circuit in a row driver circuit used in still another embodiment of the present invention.

In the embodiments described above, a case is described as an example in which the Ron correction is performed on the multi-output row selection drivers by one operational amplifier 205 serving as common comparison unit. In this embodiment, an operational amplifier 503 is provided for every row wiring drive output as shown in FIG. 26, and inputs potential information of an output terminal of output buffer to a control input terminal 504. With this structure, the gate voltage of an FET 502 is directly driven by the operational amplifier 503 so that an output 501 is constant, and the output is thus corrected.

Embodiment 4

In this embodiment, a case is described as an example in which the new Vn drive is employed for the column wiring drive of a cold-cathode display serving as the matrix panel, and the voltage drop of the row selection voltage caused by the ON resistance of an output transistor of a row selection driver is corrected by controlling the power source voltage of the row selection driver through feed-forward control.

In the previous embodiments, the voltage drop due to the ON resistance 204 of the row selection driver output is corrected by the feedback. However, the drive data has already been determined. Therefore, it is possible to predict the voltage drop amount due to the ON resistance by calculation so that no delayed response occurs, and as a result the number of correction errors is small.

Figure 27:
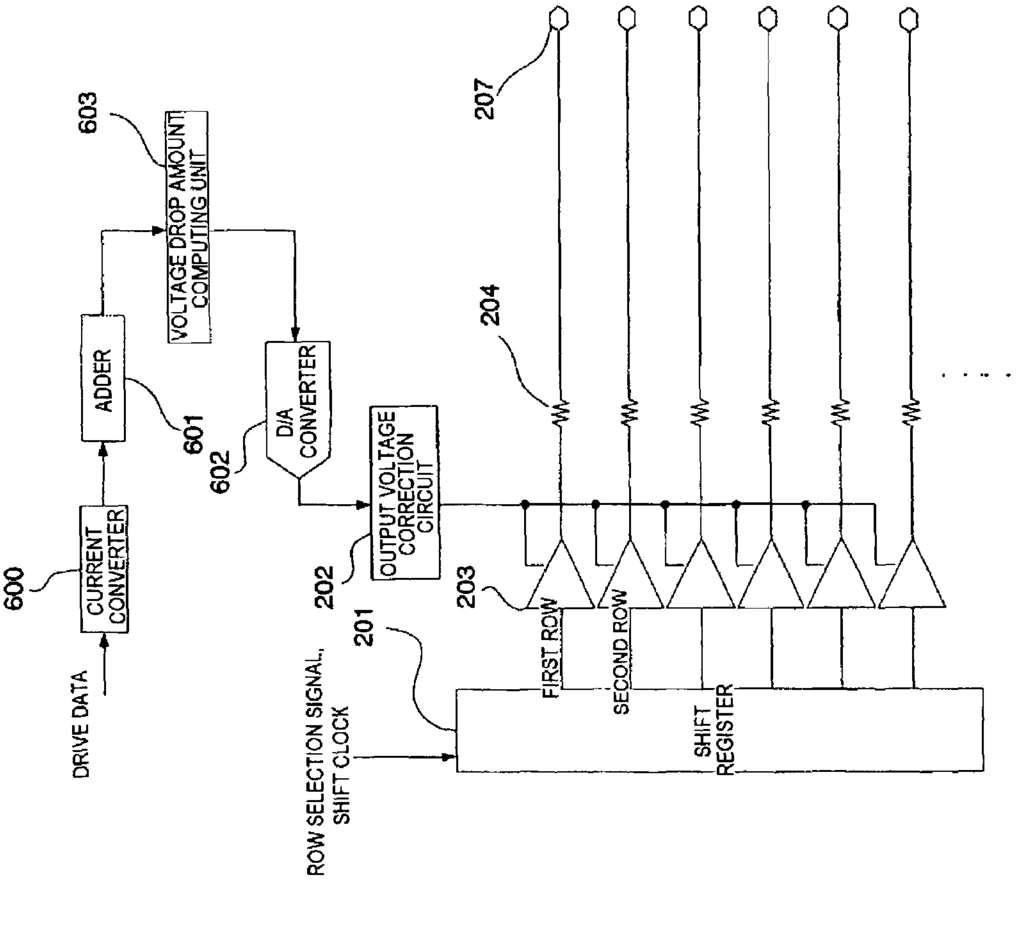
FIG. 27 is a block diagram showing a driving apparatus for a matrix panel according to another embodiment of the present invention.

As shown in FIG. 27, the drive data as gradation information such as a video signal inputted to a column wiring driver is converted into current data by a current converter 600. By an adder 601, the converted current data is added by equivalence for one row (640×3 (RGB)=1920 columns in a case of VGA) before calculating currents flowing in all column wirings.

A voltage drop amount computing unit 603 calculates the voltage drop amount in accordance with the value of the ON resistance 204 to output it to a D/A converter 602. At this time, if the voltage drop due to a lead wiring extending away from the output terminal 207, its resistance is also calculated by the voltage drop amount computing unit so that the influence of the voltage drop occurs due to the resistance of the lead wiring can be corrected.

Since the output of the D/A converter 602 is a voltage output of about 0 to 2 V and has no current drive power in many cases, the output is converted in voltage and amplified in current by the output voltage correction circuit 202. The output with current amplification from the output voltage correction circuit 202 can control the power source of the output buffer 203, and correct the voltage drop due to the ON resistance 204 and also the voltage drop due to the resistance of the lead wiring extending away from the output terminal.

Embodiment 5

Figure 28:
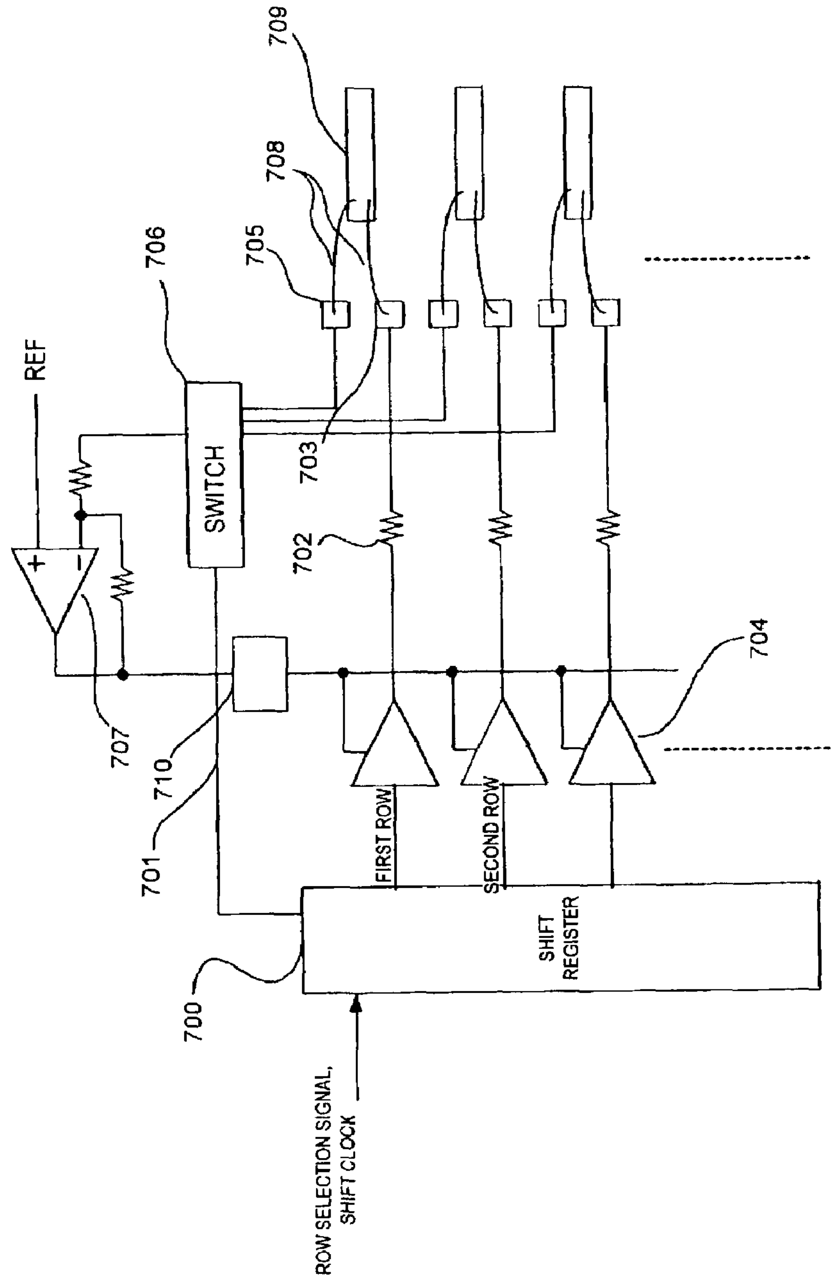
FIG. 28 is a block diagram showing a row driver circuit used in still another embodiment of the present invention.

In FIG. 28, Embodiment 5 of the present invention is shown. In Embodiment 1 described above, the structure in which the correction is mainly performed for the voltage drop caused by the ON resistance. In this embodiment, it is possible to correct the voltage drop due to other wiring resistance components.

Since other configurations and operations are the same as those of the previous embodiments including Embodiment 1, the description concerning the same structural components is omitted.

To be more specific, this embodiment has a structure in which a cold-cathode display driver is realized which compensates the output voltage inclusive of the voltage drop caused by the resistance of a bonding wire connecting IC leads on an integrated circuit package.

Since the driver circuit of the cold-cathode panel as a whole is the same as that of Embodiment 1, the description thereof is omitted here, and only the description concerning a row driver circuit is given with reference to FIG. 28.

In the circuit configuration shown in FIG. 28, a shift register 700 shifts row selection signals sequentially from top to drive respective rows by each row.

The output of the shift register 700 is connected to an output buffer 704, passes through an IC lead 709 serving as an output terminal of the IC package, and used to drive a matrix wiring provided outside the IC.

A driver ON resistance (Ron) 702 of the output buffer 704 involves a large output current as described above, and thus it is necessary to avoid the influence of the voltage drop.

This embodiment has a structure in which by using the fact that matrix drive is performed for every row but not for two rows at the same time, the feedback control is performed on output buffers for 80 rows in the IC by one externally provided feedback circuit.

When the output is made from the first row, the voltage drop occurs in the output buffer 704 due to the ON resistance (Ron) 702.

The output of the output buffer 704 is connected to a bonding pad 703 on a silicon substrate by an aluminum wiring (not shown), and further connected from the bonding pad 703 to the IC lead 709 of the package through a bonding wire 708.

For the bonding wire 708, a gold wire having a diameter of about 30 μm is generally used.

In this embodiment, to detect the voltage drop in the IC lead 709, that is, the sum of voltage drops in the output buffer 704, the unillustrated aluminum wiring, and the bonding wire, a potential detected from the IC lead 709 through the bonding wire 708 by a detecting bonding pad 705 is taken in a switch 706.

A current hardly flows in a wiring connected from the IC lead 709 through the bonding wire 708, and the detecting bonding pad 705 to the switch. Therefore, it is not necessary for the bonding wire, aluminum wiring, and the like to have low resistance. Accordingly, their sizes on the chip may be small.

A signal inputted to the switch 706 switches over the switch 706 so as to select a detection potential in a row being currently driven among detection potentials based on row information from the shift register 700 obtained through a parallel signal line 701.

The detection signal selected by the switch 706 is amplified by the operational amplifier 707 and inputted to an output voltage correction circuit 710. The output voltage correction circuit 710 then outputs a correction signal to the output buffer 704.

By providing the detecting bonding pad 705 used for the voltage feedback from the IC lead, the bonding wire 708, the switch 706, the feedback circuit 707, and the output voltage correction circuit 710 as described above, it is possible to detect the voltage drop caused by all resistances including the ON resistance of the output buffer 704, aluminum wiring resistance, and bonding wire resistance. Moreover, it is also possible to make the apparent resistance value approach 0Ú. As a result, the chip area can be made small, and a semiconductor integrated circuit can be manufactured at low costs.

Embodiment 6

Figure 29:
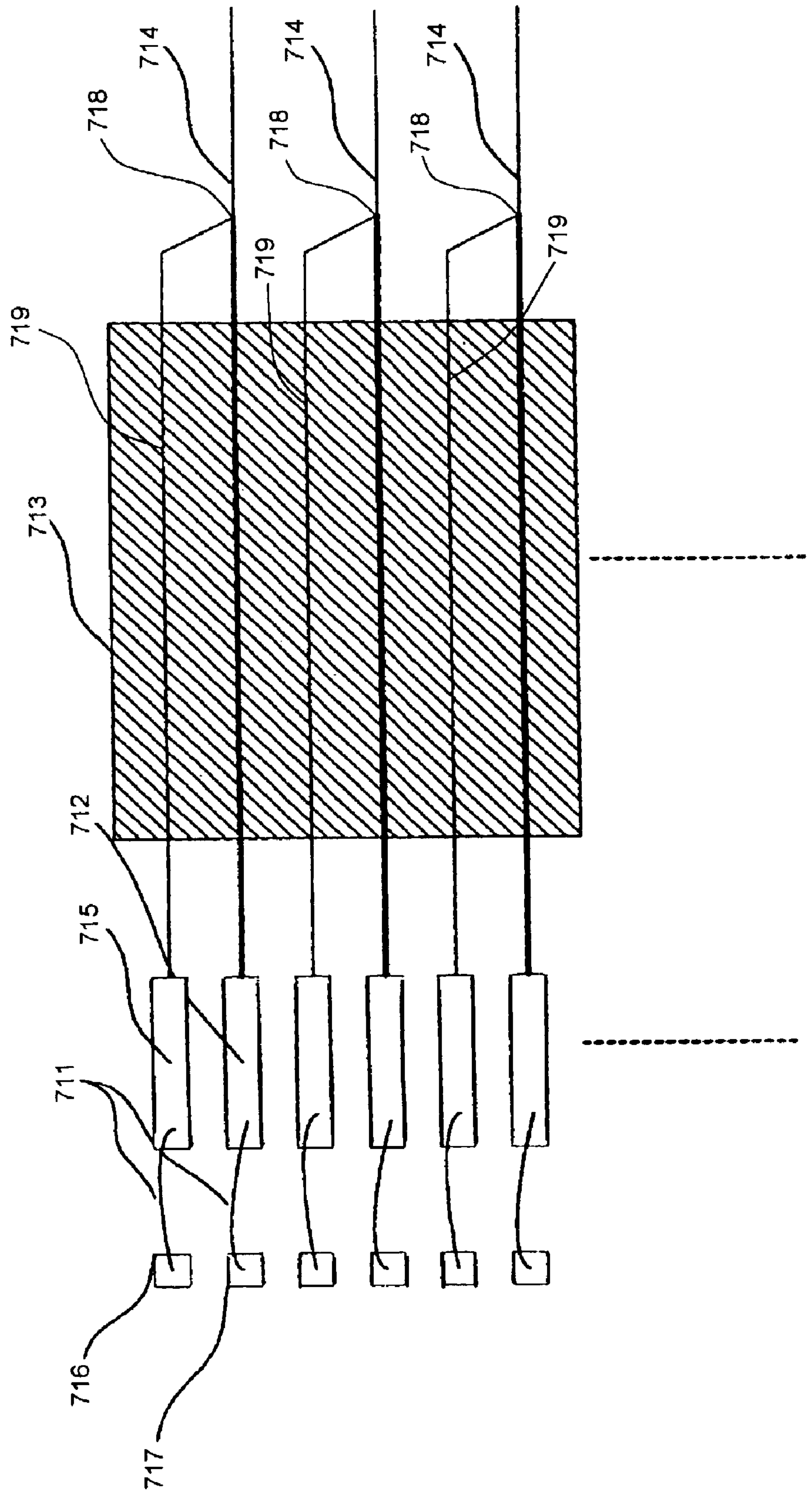
FIG. 29 shows a connection structure between a matrix panel and a row driver circuit used in yet still another embodiment of the present invention.

In FIG. 29, Embodiment 6 of the present invention is shown.

For the connection between row wirings on a matrix panel and an IC, a flexible wiring is often used. The influence of voltage drop due to the resistance generated in the flexible wiring is also not negligible.

In the above circumstances, by realizing the connection shown in FIG. 29, it is possible to compensate the resistance of the flexible wiring.

A bonding pad 717 to be connected to an output buffer of a row driver circuit shown in FIG. 29 is connected to a corresponding output IC lead 712 by a bonding wire 711.

A bonding pad for potential information detection 716 is connected also by the bonding wire 711 to an IC lead 715 for input of external potential information of the IC. Similar to the circuit of FIG. 28, the bonding pad 716 is connected to the switch unit 706 in the IC chip.

The output voltage from the output IC lead 712 is connected to a row wiring 714 on the matrix panel through a flexible wiring 713. The resistance of the flexible wiring 713 causes the voltage drop to some extent because the wiring pitch is narrowed along with the increase in resolution of the display panel.

On the contrary, the potential is detected at a nearer point 718 of the row wiring and a feedback wiring 719 is provided for the flexible wiring. Therefore, the potential detected at the point 718 extremely closer to the input terminal of the row wiring is taken into the IC chip through a wiring 719, an IC lead 715, a bonding wire 711, and a bonding pad 716 for feedback. Thus, the output voltage can be corrected while taking into consideration the resistance of the flexible wiring 713. Thus, the influence of the resistance along with the high resolution can be avoided.

As in a tape carrier package (TCP), when the row driver circuit chip is mounted on the flexible wiring, the bonding wires 711 and the IC leads 715 are eliminated in FIG. 29, and the bonding pads 716 and 717 may be bonded to the inner leads of the flexible wiring 713 in a direct manner. Also, like a COG (chip on glass), the row driver circuit chip may be mounted on the substrate constituting the matrix panel through flip chip bonding in a direct manner. In this case, the potential information of the output terminal of the output buffer is monitored, which substantially equals the operation of monitoring the potential information of the input terminal of the matrix panel.

Embodiment 7

A feature of this embodiment resides in a driving apparatus for a matrix panel in which a modulation element is arranged in an intersection of a matrix composed of row wirings and plural column wirings. The driving apparatus includes: the row driver circuit (FIG. 30) adapted to supply to the row wiring the row signal; the column driver circuit adapted to supply to the plural column wirings the modulation signal modulated according to the gradation information; the first correction circuits (206, 205, 214, and 203) adapted to correct the row signal voltage through the feedback of the potential information of the output terminal 207 in the row driver circuit; and the second correction circuits (216, 215, 205, 214, and 203) adapted to correct the voltage drop due to the resistance of the connection member between the output terminal and the matrix panel and the current flowing therethrough. Here, the second correction circuit may detect the current flowing into the connection member and convert the detected current to a voltage by using the adjustment element 218 having the resistance value previously set according to the resistance value of the connection member to thereby correct the voltage of the row signal based on the converted voltage.

A detailed description thereof will be given below.

Figure 30:
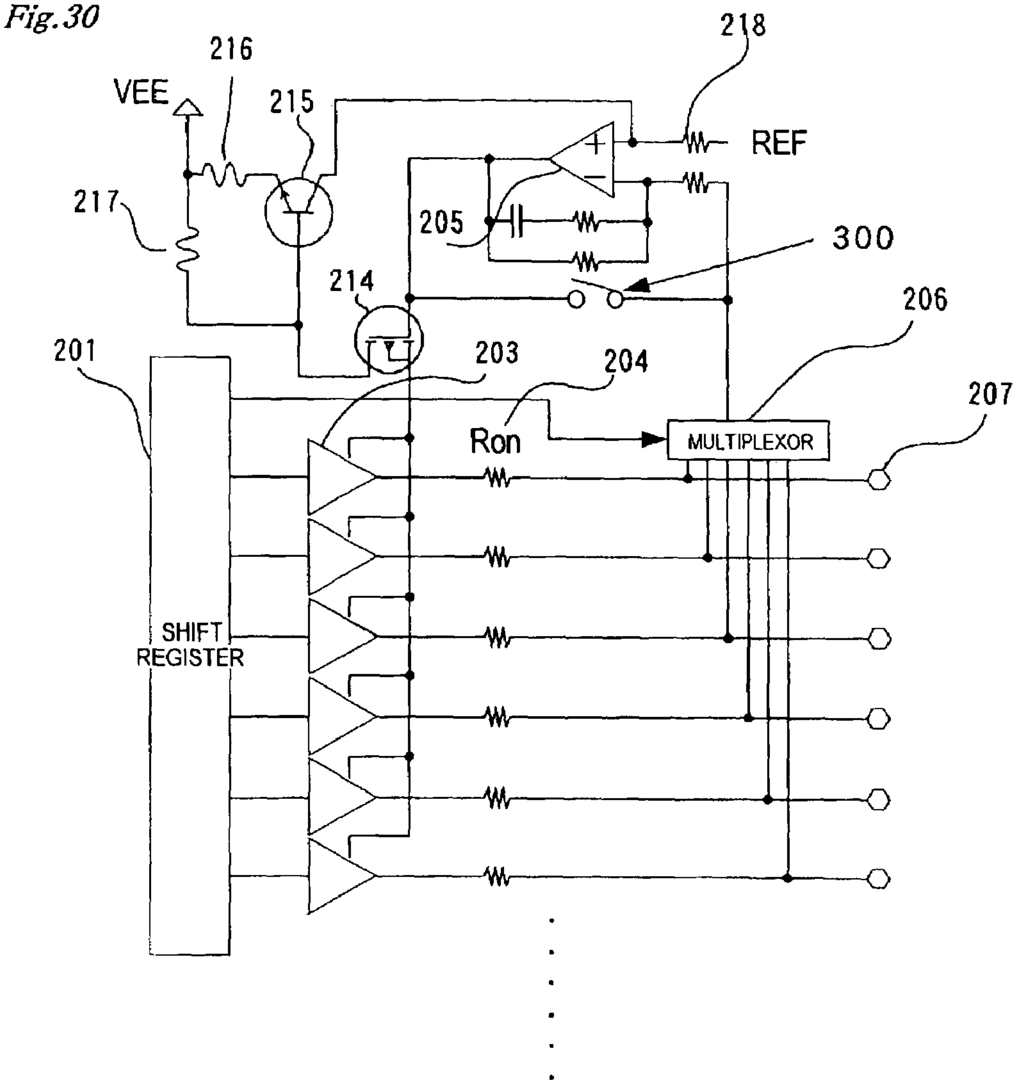
FIG. 30 is a block diagram showing a driving apparatus for a matrix panel according to an embodiment of the present invention.

FIG. 30 shows Embodiment 7 of the present invention. In Embodiment 5 above, in order that the output voltage is corrected considering the voltage drop caused due to the resistance of the bonding wire that connects between the bonding pad and the IC lead, the structure is adopted, in which the feedback to the inside of the row driver circuit chip through the potential detecting bonding pad 705 is used.

In this embodiment, a structure is employed, in which the current flowing into the output buffer of the row driver circuit chip is detected to thereby correct the voltage drop due to the resistance components outside the chip.

The other structures and operations are the same as in Embodiment 1.

FIG. 30 is a circuit diagram showing a row driver circuit chip.

In the circuit configuration shown in FIG. 30, the rows are selected row by row through the shift operation for the row selection signals by the shift resister 201 in order from the top line. The output of the shift register 201 is inputted to the output buffer 203. The row selection signal from the output buffer 203 is supplied to the row wiring of the matrix panel, which is connected to the output terminal 207 of the row driver circuit chip through the output terminal, so that the display element connected to the row wiring is driven.

At this time, according to this embodiment, the voltage drop due to the ON resistance 204 of the output buffer 203 is corrected through the feedback. Further, the voltage drop due to the resistance of the wiring member connecting between the row driver circuit chip and the matrix panel is corrected through the feed-forward.

The method of correcting the voltage drop due to the ON resistance 204 of the output buffer 203 and the current flowing there into through the feedback is the same as in the above embodiment. That is, the row the potential information of which should be detected is selected in the multiplexor 206 and it is inputted into the operational amplifier 205 as the control circuit. The operational amplifier 205 controls the transistor 214 constituting the output voltage correction circuit, so that the power source voltage to be supplied to the output buffer 203 can be changed. Thus, due to the current flowing into the transistor of the output buffer 203 and the ON resistance thereof, if the considerable voltage drop occurs, the feedback follows this voltage drop, so that the voltage of the row selection signal (difference from the row non-selection voltage) increases. Thus, the correction of the voltage drop due to the ON resistance is made.

On the other hand, the voltage drop due to the resistance of the connection member that connects between the row driver circuit and the matrix panel and the current flowing therethrough is corrected by previously setting the values of the resistances 217, 216, and 218 of FIG. 30 according to the resistance value of the connection member, that is, the feed-forward.

The operational amplifier 205 controls the control electrode (gate electrode) of the p-channel power source controlling transistor 214 to thereby control the output voltage of the power source controlling transistor 214. The output voltage of the power source controlling transistor 214 corresponds to the power source voltage of the output buffer 203.

The power source controlling FET 214 is connected to the reference voltage VEE through the output current detecting resistance 217. Through the resistance 217, the FET 214, and the transistor of the output buffer, the current is caused to flow. Therefore, the voltage of the control electrode (base electrode) of the reference voltage control transistor (current detecting transistor) 215 varies in proportion to the output current flowing from each selected output buffer 203 of the row driver circuit chip.

If the current flowing into the output buffer 203 increases, the base voltage to the reference voltage control transistor 215 increases due to the resistance 217. Because of the increase in base voltage, the corrector current of the NPN-type reference voltage control transistor 215 increases. The corrector current is limited by the current limiting resistance 216 to approximate ((resistance value of the resistance 217)/(resistance value of the limiting resistance 216)) times the current flowing into the resistance 217. The above current and the reference voltage limiting resistance 218 are used to reduce the reference voltage ref inputted into the operational amplifier 205. If the reference voltage ref of the operational amplifier 205 is reduced, the output voltage of the operational amplifier 205 is decreased, so that the output voltage of the output buffer 203 varies.

The resistance value of the connection member that connects between the row driver circuit chip and the matrix panel is defined in advance. Thus, if the values of the output current detecting resistance 217, the current limiting resistance 216, and the reference voltage limiting resistance 218 are set according to the resistance value, the voltage can be outputted to the output terminal 207 of the row driver circuit chip inclusive of the voltage covering the voltage drop due to the resistance of the connection member. That is, the current flowing into the connection member is detected through the selected output terminal 207 and the flowing current is converted to the voltage through the corresponding transistor 214 for feedback to the operational amplifier 205.

In other words, the value of current flowing into the connection member is fed back and the resistance value of the connection member is fed forward, so that the voltage drop due to the resistance of the connection member can be assumed to be corrected. Accordingly, the voltage drop in a single current passage that undergoes no branching on the downstream side of the output terminal can be corrected arbitrarily based on the setting of the reference voltage limiting resistance 218 or the like. Namely, the correctable connection member is not defined uniquely but can be determined arbitrarily. Therefore, the connection member is defined as a member including the components of the output terminal 207 to the electrode of the element closest to the output terminal 207 in the matrix panel. The resistance value of the components constituting the connection member is measured or calculated in advance. When the reference voltage limiting resistance 218 or the like is set according to the measured or calculated resistance value, the voltage drop in the above connection member can be corrected. In this way, according to this embodiment, the voltage drop due to the ON resistance and the resistance of the wiring member, and the current flowing thereinto can be corrected.

Embodiment 8

Figure 33:
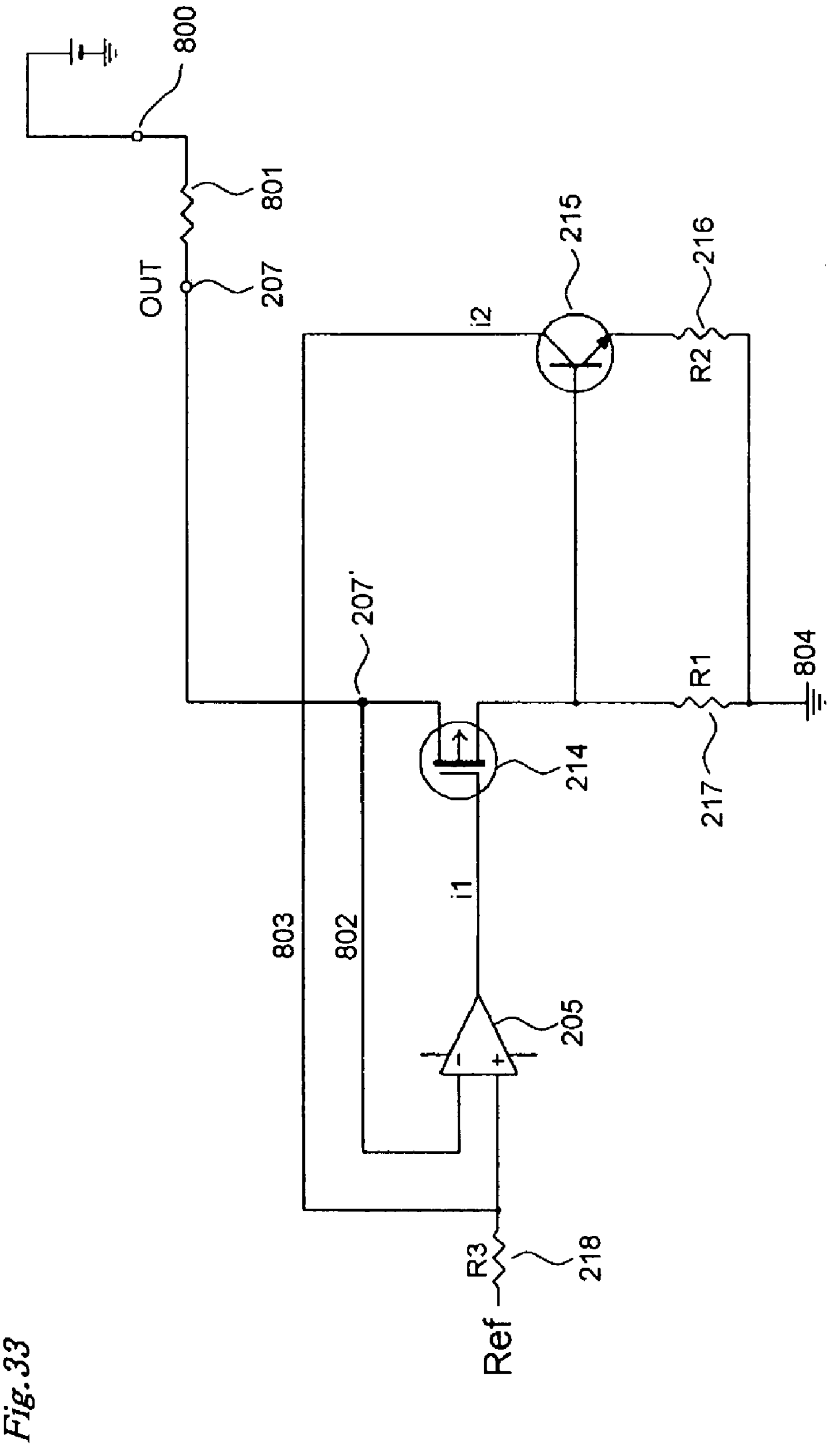
FIG. 33 shows a circuit configuration of a driving apparatus for a matrix panel according to an embodiment of the present invention.

FIG. 33 shows the main part of the driver circuit including the correction circuit as described above. In this embodiment, the driver circuit having a driving output terminal connected through the connection member to the light emitting element or electron emitting element includes: the driving transistor in which a pair of main electrodes are connected to the driving output terminal side and the reference voltage source side; the operational amplifier as a control circuit adapted to control the output voltage from the driving transistor (power source controlling transistor); the detecting transistor (reference voltage control transistor) adapted to detect the current flowing into the driving transistor; and the correction circuit adapted to correct the output voltage from the driving output terminal. In the driver circuit, the correction circuit includes a feedback loop adapted to detect the current flowing into the detecting transistor for feedback to the operational amplifier as the control circuit.

In FIG. 33, the driver circuit has a driving output terminal 207 connected through a connection member 801 to a modulation element 800 such as the light emitting element (laser diodes light emitting diode, or EL element) or the electron emitting element. Such a driver circuit includes: a driving transistor 214 in which a pair of main electrodes (source and drain) are connected to the driving output terminal 207 side and a reference voltage source 804 side; an operational amplifier 205 as a control circuit adapted to control the output voltage from the driving transistor 214; a detecting transistor 215 adapted to detect the current flowing into the driving transistor 214; a first feedback loop 802 adapted to detect the output voltage of the driving output terminal 207 for feedback to the operational amplifier 205; a second feedback loop 803 adapted to detect the current flowing into the detecting transistor 215 for feedback to the operational amplifier 205; and a correction circuit adapted to correct the output voltage from the driving output terminal 207.

To be exact, as the output voltage, instead of detecting the voltage of the driving output terminal 207, the voltage at a detection node 207' is detected. This is because the resistance between the terminal 207 and the node 207' is ignorable in terms of design. In the case of the unignorable resistance, however, the detection node 207' may be assumed as the driving output terminal 207.

Here, for simplicity in description, the base current of the a detecting transistor 215 and a base-emitter voltage Vbe thereof are not taken into consideration. Further, the ON resistance value of the driving transistor 214 is represented by R0. The resistance value of the resistance 217 is represented by R1. The resistance value of the resistance 216 is represented by R2. The resistance value of the resistance 218 as the adjustment element is represented by R3. Further, the current flowing into the driving transistor 214 is set as i1 and the current flowing into the detecting transistor 215 is set as i2. Based on the above provision, the resistance values R1 and R2 are set such that the current i1 approximates the current several hundred times higher than the current i2.

The correction performed using the first feedback loop 802 is as described above, so that the description thereof will be omitted here.

If the current i1 is caused to flow as the drive current, due to the resistance 217, the forward bias is applied between the base and the emitter of the transistor 215 to cause the current i2 to flow between the corrector and the emitter of the transistor 215. The current i2 corresponds to a small amount of current in proportion to the drive current flowing through the driving transistor 214. Therefore, the voltage drop develops at the resistance 218 connected to the correction reference voltage Ref and the noninversion input terminal of the operational amplifier 205. As a result, the potential of the noninversion input terminal varies depending on the current i2 and the resistance value R3. According to the variation, the output value of the operational amplifier 205 changes, so that the voltage of the control electrode (gate) of the driving transistor 214 changes to thereby control the transistor 214 so as to allow more current to flow therethrough.

In other words, provided that the current flowing into the output terminal 207 is Io, the potential of the output terminal 207 is Vo, and the potential of the reference voltage Ref is Vref, Vo=Vref−Io·R1/R2·R3. Thus, along with the change of the value of Io, the potential of the output terminal 207 also changes according to the voltage set based on the respective resistances (216, 217, and 218) as the adjustment elements. Therefore, if the resistance value of the adjustment element is set according to the resistance value of the connection member, the potential of the output terminal can be made lower, and the voltage drop of the connection member can be corrected.

Note that, the switch of the multiplexor 206 is disposed between the node 207' and the operational amplifier 205 and the switching transistor of the output buffer 203 is disposed between the node 207' and the transistor 214, thereby attaining one row in the structure shown in FIG. 30.

Embodiment 9

In this embodiment, the driving apparatus for a matrix panel in which the modulation elements are arranged in the intersections of the matrix composed of the row wirings and the plural column wirings includes: the row driver circuit adapted to supply the row signals to the row wirings; the column driver circuit adapted to supply to the plural column wirings the modulation signals that are modulated according to the gradation information; the first correction circuit adapted to correct the voltage of the row signal through the feedback of the potential information of the output terminal of the row driver circuit; and the second correction circuit adapted to correct the voltage drop due to the resistance of the connection member between the output terminal and the matrix panel and the current flowing thereinto.

Further, the second correction circuit includes the feed-forward circuit adapted to correct the row signal according to the gradation information.

In other words, in the embodiment shown in FIG. 30, as the second correction circuit, the gradation information is detected from the image data on the column driver circuit side to obtain the value of the current to be caused to flow into the row wiring at the driving time. According to the detected current value, the row signal is corrected. Such a feed-forward circuit adopts the same configuration as in the embodiment shown in FIG. 27 and the ON resistance Ron can be corrected by the first correction circuit. Thus, it may be calculated considering the resistance value of the connection member.

As described above, according to the present invention, the modulation signal is selected, which is used in combination with the correction circuit that corrects the voltage drop due to the ON resistance at the output stage, whereby the error caused during the correction can be considerably reduced. As a result, it is unnecessary to meet the requirement for the high-performance in the row driver circuit including the correction circuit, which leads to further reduction in cost.

Also, according to another embodiment of the present invention, the output voltage obtained by correcting the voltage drop due to the resistance connected on the downstream side of the driving output terminal and the current flowing thereinto can be achieved.

What is claimed is:

1. A driving apparatus for modulation elements which are wired in matrix with a plurality of row wirings and a plurality of column wirings, comprising:

a row driver circuit adapted to supply a row signal to the row wiring;

a column driver circuit adapted to supply to the plurality of column wirings a modulation signal modulated in accordance with gradation information;

a first correction circuit adapted to correct a voltage of the row signal through feedback of potential information of an output terminal in the row driver circuit; and a second correction circuit adapted to correct a voltage drop due to a resistance of a connection member between the output terminal and the element array and a current flowing into the resistance.

2. A driving apparatus according to claim 1, wherein the second correction circuit includes a feed-forward circuit adapted to correct the row signal in accordance with the gradation information.

3. A driving apparatus according to claim 1, wherein the second correction circuit detects the current flowing into the connection member, converts the detected current to a voltage using an adjustment element having a resistance value previously set according to a resistance value of the connection member, and corrects a voltage of the row signal based on the voltage.

4. An image display apparatus comprising:

(i) a matrix panel including: a row wiring; a plurality of column wirings; and a plurality of modulation elements corresponding to intersections of a matrix composed of the row wiring and the plurality of column wirings; and (ii) a driving apparatus for the matrix panel, including:

a row driver circuit adapted to supply a row signal to the row wiring;

a column driver circuit adapted to supply to the plurality of column wirings a modulation signal having a pulse width and a voltage amplitude with at least the pulse width modulated according to gradation information;

a first correction circuit adapted to correct a voltage of the row signal through feedback of potential information of an output terminal in the row driver circuit; and a second correction circuit adapted to correct a voltage drop due to a resistance of a connection member between the output terminal and the matrix panel and a current flowing into the resistance.

5. A driver circuit having a driving output terminal connected with an emission element through a connection member, comprising:

a driving transistor in which a pair of main electrodes are connected to the driving output terminal side and a reference voltage source side;

an operational amplifier as a control circuit adapted to control an output voltage from the driving transistor;

a detecting transistor adapted to detect a current flowing into the driving transistor; and a correction circuit adapted to correct the output voltage from the driving output terminal, wherein the correction circuit includes a feedback loop adapted to detect a current flowing into the detecting transistor for feedback to the operational amplifier as the control circuit.

6. A driver circuit according to claim 5, wherein an adjustment element having a resistance value previously set according to a resistance value of the connection member is used to convert the detected current flowing into the detecting transistor to a voltage and correct an output voltage based on the voltage.

7. A driver circuit having a driving output terminal connected with an emission element through a connection member, comprising:

a driving transistor in which a pair of main electrodes are connected to the driving output terminal side and a reference voltage source side;

a control circuit adapted to control an output voltage from the driving transistor;

a detecting transistor adapted to detect a current flowing into the driving transistor; and a correction circuit adapted to correct the output voltage from the driving output terminal, wherein the correction circuit includes a first feedback loop adapted to detect the output voltage of the driving output terminal for feedback to the control circuit and a second feedback loop adapted to detect a current flowing into the detecting transistor for feedback to the control circuit.

8. A driver circuit according to claim 7, wherein an adjustment element having a resistance value previously set according to a resistance value of the connection member is used to convert the detected current flowing into the detecting transistor to a voltage and correct an output voltage based on the voltage.

9. An image display apparatus comprising:

(i) a matrix panel including: a plurality of row wirings; a plurality of column wirings; and a plurality of modulation elements corresponding to intersections of a matrix composed of the plurality of row wirings and the plurality of column wirings;

(ii) a driving device adapted to drive the matrix panel, which includes:

a driving transistor in which a pair of main electrodes are connected to the driving output terminal side adapted to supply a signal and a reference voltage source side;

a control circuit adapted to control an output voltage from the driving transistor;

a detecting transistor adapted to detect a current flowing into the driving transistor;

a feedback loop adapted to detect a current flowing into the detecting transistor for feedback to the control circuit; and a correction circuit adapted to correct the output voltage from the driving output terminal; and (iii) a connection member that electrically connects the matrix panel and the driving device to thereby supply a signal adapted to drive the modulation element.

10. An image display apparatus according to claim 9, further comprising a feedback loop adapted to detect an output voltage of the driving output terminal for feedback to the control circuit.

11. An image display apparatus according to claim 10, wherein an adjustment element having a resistance value previously set according to a resistance value of the connection member is used to convert the detected current flowing into the detecting transistor to a voltage and correct an output voltage based on the voltage.

12. A driving apparatus for a matrix panel in which modulation elements are wired in matrix with a plurality of row wirings and a plurality of column wirings, comprising:

a row driver circuit adapted to supply a row selection signal to the row wiring selected among the plurality of row wirings;

a column driver circuit adapted to supply a modulation signal to the plurality of column wirings; and a correction circuit that corrects a voltage of the row selection signal so as to suppress a voltage variation of the row selection signal due to a voltage drop caused by at least a resistance of an output stage of the row driver circuit and a current caused to flow into the output stage connected to a selected row wiring, wherein the column driver circuit is adapted to perform modulating of a pulse width and a voltage amplitude of a modulation signal according to gradation information, and the modulation signal to be generated in one horizontal period has a portion rising in step shape of voltage amplitude and/or a portion falling in step shape of voltage amplitude.

13. A driving apparatus according to claim 12, wherein said correction circuit has a feed-forward circuit adapted to correct the row selection signal supplied to the selected row wiring according to the gradation information.

14. A driving apparatus according to claim 12, wherein the portion rising in step shape of voltage amplitude has a portion rising from a voltage amplitude corresponding to a low gradation level to a voltage amplitude corresponding to a high gradation level.

15. A driving apparatus according to claim 12, wherein the portion rising in step shape of voltage amplitude has a portion rising from a voltage amplitude corresponding to a low gradation level to a voltage amplitude corresponding to a high gradation level, and the portion falling in step shape of voltage amplitude has a portion falling from a voltage amplitude corresponding to a high gradation level to a voltage amplitude corresponding to a low gradation level.

16. A driving apparatus according to claim 12, wherein the column driver circuit performs the pulse width modulation at a predetermined amplitude within a range of a low gradation level and performs the pulse width modulation at a larger amplitude within a range of a high gradation level.

17. A driving apparatus according to claim 12, wherein the column driver circuit selects between start synchronous pulse width modulation started from a start time side in the one horizontal scanning period and end synchronous pulse width modulation started from an end time side in the one horizontal scanning period.

18. An image display apparatus comprising:

(i) a matrix panel including: a row wiring; a plurality of column wirings; and a plurality of modulation elements corresponding to intersections of a matrix composed of the row wiring and the plurality of column wirings; and (ii) a driving apparatus according to claim 12.

19. A driving apparatus for a matrix panel in which modulation elements are wired in matrix with a plurality of row wirings and a plurality of column wirings, comprising:

a row driver circuit adapted to supply a row selection signal to the row wiring selected among the plurality of row wirings;

a column driver circuit adapted to supply a modulation signal to the plurality of column wirings; and a correction circuit that corrects a voltage of the row selection signal by feedback control, wherein the column driver circuit is adapted to perform modulating of a pulse width and a voltage amplitude of a modulation signal according to gradation information, and the modulation signal to be generated in one horizontal period has a portion rising in step shape of voltage amplitude and/or a portion falling in step shape of voltage amplitude.

20. An image display apparatus comprising:

(i) a matrix panel including: a row wiring; a plurality of column wirings; and a plurality of modulation elements corresponding to intersections of a matrix composed of the row wiring and the plurality of column wirings; and (ii) a driving apparatus according to claim 19.

* * * * *